(12) United States Patent
Rafati et al.

(10) Patent No.: US 12,054,388 B2
(45) Date of Patent: Aug. 6, 2024

(54) SYSTEMS AND METHODS FOR PRODUCTION AND SEPARATION OF HYDROGEN AND CARBON DIOXIDE

(71) Applicant: 8 Rivers Capital, LLC, Durham, NC (US)

(72) Inventors: Mohammad Rafati, Durham, NC (US); Rodney John Allam, Chippenham (GB)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

(21) Appl. No.: 17/365,611

(22) Filed: Jul. 1, 2021

(65) Prior Publication Data

US 2021/0323818 A1 Oct. 21, 2021

Related U.S. Application Data

(62) Division of application No. 16/185,188, filed on Nov. 9, 2018, now Pat. No. 11,066,298.

(Continued)

(51) Int. Cl.
*C01B 3/38* (2006.01)
*B01D 3/14* (2006.01)
(Continued)

(52) U.S. Cl.
CPC .............. *C01B 3/382* (2013.01); *B01D 3/14* (2013.01); *B01D 53/002* (2013.01); *B01D 53/047* (2013.01); *B01D 53/261* (2013.01); *B01J 7/00* (2013.01); *B01J 19/0013* (2013.01); *B01J 19/245* (2013.01); *C01B 3/00* (2013.01); *C01B 3/36* (2013.01); *C01B 3/506* (2013.01); *C01B 3/56* (2013.01); *C01B 32/50* (2017.08);
(Continued)

(58) Field of Classification Search
CPC ....... B01J 8/001; B01J 19/0013; C01B 3/382; C01B 3/36; C01B 3/56; C01B 32/50; B01D 53/047
See application file for complete search history.

(56) References Cited

U.S. PATENT DOCUMENTS 4,185,456 A 1/1980 Cummings
4,498,289 A 2/1985 Osgerby
(Continued)

FOREIGN PATENT DOCUMENTS

CN 101016490 A 8/2007
CN 102410703 4/2012
(Continued)

OTHER PUBLICATIONS

Notification to Grant Patent Right for Invention issued Jun. 13, 2024, in corresponding Chinese Application No. 2022103142780.

*Primary Examiner* — Lessanework Seifu
(74) *Attorney, Agent, or Firm* — Womble Bond Dickinson (US) LLP

(57) ABSTRACT

The present disclosure relates to systems and methods useful for providing one or more chemical compounds in a substantially pure form. In particular, the systems and methods can be configured for separation of carbon dioxide from a process stream, such as a process stream in a hydrogen production system. As such, the present disclosure can provide systems and method for production of hydrogen and/or carbon dioxide.

19 Claims, 2 Drawing Sheets

Related U.S. Application Data

(60) Provisional application No. 62/670,175, filed on May 11, 2018, provisional application No. 62/583,816, filed on Nov. 9, 2017.

(51) Int. Cl.
| | |
|---|---|
| *B01D 53/00* | (2006.01) |
| *B01D 53/047* | (2006.01) |
| *B01D 53/26* | (2006.01) |
| *B01J 7/00* | (2006.01) |
| *B01J 19/00* | (2006.01) |
| *B01J 19/24* | (2006.01) |
| *C01B 3/00* | (2006.01) |
| *C01B 3/36* | (2006.01) |
| *C01B 3/50* | (2006.01) |
| *C01B 3/56* | (2006.01) |
| *C01B 32/50* | (2017.01) |
| *F25J 3/02* | (2006.01) |

(52) U.S. Cl.
CPC ......... *F25J 3/0223* (2013.01); *F25J 3/0252* (2013.01); *F25J 3/0266* (2013.01); *F25J 3/0295* (2013.01); *B01D 2253/108* (2013.01); *B01D 2253/116* (2013.01); *B01D 2256/16* (2013.01); *B01D 2256/22* (2013.01); *B01D 2257/504* (2013.01); *B01D 2259/65* (2013.01); *B01J 2219/00103* (2013.01); *B01J 2219/00108* (2013.01); *C01B 2203/042* (2013.01); *C01B 2203/046* (2013.01); *C01B 2203/0475* (2013.01); *C01B 2203/066* (2013.01); *C01B 2203/0883* (2013.01); *C01B 2203/1241* (2013.01); *C01B 2203/84* (2013.01); *F25J 2200/02* (2013.01); *F25J 2200/40* (2013.01); *F25J 2200/70* (2013.01); *F25J 2205/40* (2013.01); *F25J 2205/50* (2013.01); *F25J 2205/60* (2013.01); *F25J 2205/64* (2013.01); *F25J 2220/02* (2013.01); *F25J 2230/32* (2013.01); *F25J 2230/80* (2013.01); *F25J 2235/80* (2013.01); *F25J 2270/02* (2013.01)

(56) References Cited

U.S. PATENT DOCUMENTS

| | | | |
|---|---|---|---|
| 4,725,380 A | 2/1988 | Pinto | |
| 6,214,066 B1* | 4/2001 | Nataraj | C01B 3/501 |
| | | | 423/245.3 |
| 6,301,927 B1 | 10/2001 | Reddy | |
| 6,474,069 B1 | 11/2002 | Smith | |
| 6,500,241 B2* | 12/2002 | Reddy | B01D 53/047 |
| | | | 96/243 |
| 6,534,551 B2 | 3/2003 | Allam et al. | |
| 6,932,958 B2 | 8/2005 | Wangerow et al. | |
| 6,946,016 B2 | 9/2005 | Reddy | |
| 6,966,171 B2 | 11/2005 | Uematsu et al. | |
| 7,056,480 B2 | 6/2006 | Ogawa | |
| 7,089,727 B2 | 8/2006 | Schütz | |
| 7,138,001 B2 | 11/2006 | Knez et al. | |
| 7,179,324 B2 | 2/2007 | Baksh et al. | |
| 7,182,917 B2 | 2/2007 | Krueger | |
| 7,182,921 B2 | 2/2007 | Miura et al. | |
| 7,192,569 B2 | 3/2007 | Stewart | |
| 7,220,505 B2* | 5/2007 | Malhotra | B01J 8/065 |
| | | | 208/62 |
| 7,247,656 B2 | 7/2007 | Guo et al. | |
| 7,252,692 B2 | 8/2007 | Rei | |
| 7,326,482 B2 | 2/2008 | Haltiner, Jr. et al. | |
| 7,341,609 B2 | 3/2008 | DeVries | |
| 7,393,382 B2 | 7/2008 | Givens | |
| 7,399,342 B2 | 7/2008 | Bizjak | |
| 7,404,846 B2 | 7/2008 | Golden et al. | |
| 7,419,648 B2 | 9/2008 | Kuipers et al. | |
| 7,427,368 B2 | 9/2008 | Drnevich | |
| 7,550,215 B2 | 6/2009 | Malhotra et al. | |
| 7,574,855 B2 | 8/2009 | Benz et al. | |
| 7,611,676 B2 | 11/2009 | Inage et al. | |
| 7,628,963 B2 | 12/2009 | Woo et al. | |
| 7,635,399 B2 | 12/2009 | Su | |
| 7,686,856 B2 | 3/2010 | Hemmings et al. | |
| 7,695,708 B2 | 4/2010 | Peng et al. | |
| 7,708,812 B2 | 5/2010 | Shinkai et al. | |
| 7,727,509 B2 | 6/2010 | Abbott et al. | |
| 7,731,935 B2 | 6/2010 | Brady et al. | |
| 7,763,086 B2 | 7/2010 | Woods et al. | |
| 7,763,098 B2 | 7/2010 | Alizadeh-Khiavi et al. | |
| 7,815,892 B2 | 10/2010 | Hershkowitz et al. | |
| 7,828,864 B2 | 11/2010 | Edlund et al. | |
| 7,833,311 B2 | 11/2010 | Givens | |
| 7,833,326 B2 | 11/2010 | Bizjak | |
| 7,837,765 B2 | 11/2010 | Adams et al. | |
| 7,837,973 B2 | 11/2010 | Snyder et al. | |
| 7,883,672 B2 | 2/2011 | Woo et al. | |
| 7,908,842 B2 | 3/2011 | Eroglu et al. | |
| 7,914,764 B2 | 3/2011 | Hershkowitz et al. | |
| 7,931,888 B2 | 4/2011 | Drnevich et al. | |
| 7,932,296 B2 | 4/2011 | Malhotra et al. | |
| 7,950,239 B2 | 5/2011 | Lilley et al. | |
| 7,960,441 B2 | 6/2011 | Wolf | |
| 7,985,399 B2 | 7/2011 | Drnevich et al. | |
| 7,988,948 B2 | 8/2011 | Guvelioglu et al. | |
| 8,021,464 B2 | 9/2011 | Gauthier et al. | |
| 8,025,862 B2 | 9/2011 | Rojey et al. | |
| 8,034,321 B2 | 10/2011 | Mauthner et al. | |
| 8,038,748 B2 | 10/2011 | Edlund | |
| 8,038,771 B2 | 10/2011 | Bizjak | |
| 8,070,841 B2 | 12/2011 | Adams et al. | |
| 8,080,070 B2 | 12/2011 | Grover | |
| 8,088,196 B2 | 1/2012 | White et al. | |
| 8,097,371 B2 | 1/2012 | Suehiro et al. | |
| 8,110,022 B2 | 2/2012 | DeVries | |
| 8,124,049 B2 | 2/2012 | Grover | |
| 8,137,422 B2 | 3/2012 | Licht et al. | |
| 8,177,868 B2 | 5/2012 | Johnston | |
| 8,187,363 B2 | 5/2012 | Grover | |
| 8,206,669 B2 | 6/2012 | Schaffer et al. | |
| 8,240,370 B2 | 8/2012 | Palamara et al. | |
| 8,257,452 B2 | 9/2012 | Menzel | |
| 8,257,668 B2 | 9/2012 | Mukai et al. | |
| 8,263,274 B2 | 9/2012 | Sonnichsen et al. | |
| 8,268,024 B2 | 9/2012 | Price | |
| 8,273,139 B2 | 9/2012 | Malhotra et al. | |
| 8,273,489 B2 | 9/2012 | Ukai et al. | |
| 8,287,763 B2 | 10/2012 | Pham et al. | |
| 8,303,930 B2 | 11/2012 | Chen et al. | |
| 8,375,723 B2 | 2/2013 | Benz et al. | |
| 8,394,174 B2 | 3/2013 | Chen et al. | |
| 8,414,666 B2 | 4/2013 | Palamara et al. | |
| 8,419,829 B2 | 4/2013 | Wallace | |
| 8,449,633 B2 | 5/2013 | Pham et al. | |
| 8,449,649 B2 | 5/2013 | Greenough | |
| 8,460,630 B2 | 6/2013 | Niitsuma et al. | |
| 8,486,180 B2* | 7/2013 | Chen | B01D 53/0473 |
| | | | 95/98 |
| 8,535,638 B2 | 9/2013 | Terrien et al. | |
| 8,551,217 B2 | 10/2013 | Baksh et al. | |
| 8,596,075 B2 | 12/2013 | Allam et al. | |
| 8,597,383 B2 | 12/2013 | Pham et al. | |
| 8,617,294 B2 | 12/2013 | Adams et al. | |
| 8,623,563 B2 | 1/2014 | Anzai | |
| 8,636,922 B2 | 1/2014 | Grover et al. | |
| 8,671,688 B2 | 3/2014 | Rogers et al. | |
| 8,673,135 B2 | 3/2014 | Colyar et al. | |
| 8,685,282 B2 | 4/2014 | Iaquaniello | |
| 8,685,358 B2 | 4/2014 | Allam | |
| 8,690,972 B2 | 4/2014 | Takata et al. | |
| 8,692,034 B2 | 4/2014 | Han | |
| 8,702,823 B2 | 4/2014 | Kani et al. | |
| 8,715,617 B2 | 5/2014 | Genkin et al. | |
| 8,726,628 B2 | 5/2014 | Wichmann et al. | |
| 8,747,498 B2 | 6/2014 | Taguchi et al. | |

(56) References Cited

U.S. PATENT DOCUMENTS

| | | |
|---|---|---|
| 8,747,806 B2 | 6/2014 | Catchpole |
| 8,752,390 B2 | 6/2014 | Wright et al. |
| 8,769,961 B2 * | 7/2014 | Allam .................. F02C 6/18 |
| | | 48/127.9 |
| 8,771,637 B2 | 7/2014 | Wynn et al. |
| 8,776,532 B2 | 7/2014 | Allam et al. |
| 8,784,531 B2 | 7/2014 | Okada et al. |
| 8,790,618 B2 | 7/2014 | Adams et al. |
| 8,808,425 B2 | 8/2014 | Genkin et al. |
| 8,852,456 B2 | 10/2014 | Valentin et al. |
| 8,869,889 B2 | 10/2014 | Palmer et al. |
| 8,900,546 B2 | 12/2014 | Van De Graaf et al. |
| 8,916,304 B2 | 12/2014 | Tamura et al. |
| 8,926,866 B2 | 1/2015 | Kim et al. |
| 8,956,587 B1 | 2/2015 | Peng et al. |
| 8,959,887 B2 | 2/2015 | Allam et al. |
| 8,986,002 B2 | 3/2015 | Palmer et al. |
| 8,986,631 B2 | 3/2015 | Berggren et al. |
| 8,992,642 B2 | 3/2015 | Vik |
| 8,992,669 B2 | 3/2015 | Ideda et al. |
| 9,028,794 B2 | 5/2015 | Darde et al. |
| 9,040,011 B2 | 5/2015 | Filippi et al. |
| 9,061,911 B2 | 6/2015 | Azad |
| 9,062,608 B2 | 6/2015 | Allam et al. |
| 9,068,743 B2 | 6/2015 | Palmer et al. |
| 9,073,007 B2 | 7/2015 | Park et al. |
| 9,101,899 B2 | 8/2015 | Singh et al. |
| 9,126,172 B2 | 9/2015 | Singh et al. |
| 9,132,402 B2 | 9/2015 | Singh et al. |
| 9,216,903 B2 | 12/2015 | McKenna et al. |
| 9,227,844 B2 | 1/2016 | Han et al. |
| 9,240,604 B2 | 1/2016 | Maenishi et al. |
| 9,242,206 B2 | 1/2016 | Okada et al. |
| 9,249,690 B2 | 2/2016 | Karni et al. |
| 9,260,303 B2 | 2/2016 | Filippi et al. |
| 9,309,130 B2 | 4/2016 | Peng et al. |
| 9,321,643 B2 | 4/2016 | Denis et al. |
| 9,321,655 B2 | 4/2016 | Singh et al. |
| 9,327,973 B1 | 5/2016 | Tsai et al. |
| 9,358,506 B2 | 6/2016 | Cheiky |
| 9,359,201 B2 | 6/2016 | Simakov et al. |
| 9,365,131 B2 | 6/2016 | Jamal et al. |
| 9,399,607 B2 | 7/2016 | Tsai et al. |
| 9,415,298 B1 | 8/2016 | Statzer |
| 9,416,728 B2 | 8/2016 | Palmer et al. |
| 9,493,350 B2 | 11/2016 | Morico et al. |
| 9,523,312 B2 | 12/2016 | Allam et al. |
| 9,550,671 B2 | 1/2017 | Darde et al. |
| 9,556,026 B1 | 1/2017 | Davis et al. |
| 9,556,027 B2 | 1/2017 | Chakravarti et al. |
| 9,580,314 B2 | 2/2017 | Darde et al. |
| 9,583,776 B2 | 2/2017 | Thornton et al. |
| 9,586,819 B2 | 3/2017 | Xu et al. |
| 9,617,152 B2 | 4/2017 | Johnston |
| 9,637,427 B2 | 5/2017 | Tsai et al. |
| 9,685,672 B2 | 6/2017 | Iiyama et al. |
| 9,745,191 B2 | 8/2017 | Pham et al. |
| 9,776,862 B2 | 10/2017 | Fujisawa et al. |
| 9,776,863 B2 | 10/2017 | Iaquaniello et al. |
| 9,802,820 B2 | 10/2017 | Iaquaniello et al. |
| 9,806,364 B2 | 10/2017 | Jamal et al. |
| 9,869,245 B2 | 1/2018 | Allam et al. |
| 9,914,643 B2 | 3/2018 | Allam |
| 9,917,320 B2 | 3/2018 | Thornton et al. |
| 9,944,522 B2 | 4/2018 | Cheiky |
| 9,969,666 B1 | 5/2018 | Roesch et al. |
| 10,008,730 B2 | 6/2018 | Jamal et al. |
| 10,018,115 B2 | 7/2018 | Allam et al. |
| 10,046,673 B1 | 8/2018 | Allam et al. |
| 10,047,671 B2 | 8/2018 | Allam et al. |
| 10,066,870 B2 | 9/2018 | Klein |
| 10,071,909 B2 | 9/2018 | Beltramini et al. |
| 10,093,542 B2 | 10/2018 | Beltramini et al. |
| 10,131,593 B2 | 11/2018 | Okada et al. |
| 10,155,661 B2 | 12/2018 | Kang et al. |
| 10,160,704 B2 | 12/2018 | Roesch et al. |
| 10,218,020 B2 | 2/2019 | Jamal et al. |
| 10,246,326 B2 | 4/2019 | Chlapik et al. |
| 10,252,910 B2 | 4/2019 | Beltramini et al. |
| 10,252,911 B2 | 4/2019 | Beltramini et al. |
| 10,256,489 B2 | 4/2019 | Kakuwa et al. |
| 10,281,203 B2 | 5/2019 | Guillard et al. |
| 10,283,795 B2 | 5/2019 | Jamal et al. |
| 10,288,346 B2 | 5/2019 | Guillard et al. |
| 10,302,357 B2 | 5/2019 | Hernandez et al. |
| 10,308,508 B2 | 6/2019 | Saloway |
| 10,370,248 B2 | 8/2019 | Kang et al. |
| 10,393,431 B2 | 8/2019 | Roesch et al. |
| 10,415,434 B2 | 9/2019 | Allam et al. |
| 10,422,252 B2 | 9/2019 | Allam et al. |
| 10,464,818 B2 | 11/2019 | Filippi et al. |
| 10,472,236 B2 | 11/2019 | Farace et al. |
| 10,533,494 B2 | 1/2020 | Xiao et al. |
| 10,549,991 B2 | 2/2020 | Wix et al. |
| 10,626,014 B2 | 4/2020 | Nicholson et al. |
| 10,633,313 B1 | 4/2020 | Roesch et al. |
| 10,634,048 B2 | 4/2020 | Forrest et al. |
| 10,634,425 B2 | 4/2020 | Guillard et al. |
| 10,662,127 B2 | 5/2020 | Beauchamp et al. |
| 10,703,629 B2 | 7/2020 | Saloway |
| 10,745,276 B2 | 8/2020 | Warta et al. |
| 10,746,461 B2 | 8/2020 | Allam |
| 10,849,714 B2 | 12/2020 | Lehtonen |
| 10,899,612 B2 | 1/2021 | Seo et al. |
| 10,919,761 B2 | 2/2021 | Lehmann et al. |
| 10,960,372 B2 | 3/2021 | Verykios et al. |
| 10,961,122 B2 | 3/2021 | Verykios et al. |
| 10,975,766 B2 | 4/2021 | Allam et al. |
| 10,988,379 B2 | 4/2021 | Fedorov et al. |
| 10,989,113 B2 | 4/2021 | Forrest et al. |
| 11,059,011 B2 | 7/2021 | Yukumoto et al. |
| 11,066,298 B2 | 7/2021 | Rafati et al. |
| 11,091,704 B2 | 8/2021 | Wegerer et al. |
| 11,130,676 B2 | 9/2021 | Nicholson et al. |
| 11,149,634 B2 | 10/2021 | Callahan |
| 11,149,636 B2 | 10/2021 | Callahan |
| 11,168,045 B2 | 11/2021 | Moreo |
| 11,174,208 B2 | 11/2021 | Beauchamp et al. |
| 11,174,759 B2 | 11/2021 | Allam et al. |
| 11,207,649 B2 | 12/2021 | Hoffman et al. |
| 11,208,323 B2 | 12/2021 | Forrest et al. |
| 11,213,795 B2 | 1/2022 | Hassler et al. |
| 11,231,224 B2 | 1/2022 | Allam et al. |
| 11,253,831 B2 | 2/2022 | Verykios et al. |
| 11,285,437 B2 | 3/2022 | Lu et al. |
| 11,305,250 B2 | 4/2022 | Verykios et al. |
| 11,345,593 B2 | 5/2022 | Mortensen |
| 11,351,517 B2 | 6/2022 | Ulber et al. |
| 11,383,978 B2 | 7/2022 | Verykios et al. |
| 11,434,133 B2 | 9/2022 | Song et al. |
| 11,441,838 B2 | 9/2022 | Vu et al. |
| 11,465,094 B2 | 10/2022 | Rah et al. |
| 11,479,462 B1 | 10/2022 | Spicer |
| 11,485,635 B2 | 11/2022 | Kawamoto et al. |
| 11,485,637 B2 | 11/2022 | Coleman et al. |
| 11,491,437 B2 | 11/2022 | Gary et al. |
| 11,491,456 B2 | 11/2022 | Ko |
| 11,492,254 B2 | 11/2022 | Harale et al. |
| 11,492,255 B2 | 11/2022 | Younes et al. |
| 11,506,122 B2 | 11/2022 | Allam et al. |
| 11,512,257 B1 | 11/2022 | Spicer et al. |
| 11,535,514 B2 | 12/2022 | Mays et al. |
| 11,554,955 B2 | 1/2023 | Tranier |
| 11,583,798 B2 | 2/2023 | Chai et al. |
| 11,583,824 B2 | 2/2023 | Harale et al. |
| 11,597,649 B2 | 3/2023 | Krishnamoorthy et al. |
| 11,607,657 B2 | 3/2023 | Verykios et al. |
| 11,608,266 B2 | 3/2023 | Moore et al. |
| 11,614,280 B2 | 3/2023 | Ko |
| 11,618,676 B2 | 4/2023 | Hill et al. |
| 2002/0004152 A1 | 1/2002 | Clawson et al. |
| 2005/0080146 A1 * | 4/2005 | Abbott .................. C01B 3/382 |
| | | 518/703 |
| 2007/0130957 A1 | 6/2007 | Hoffmann et al. |

(56) References Cited

U.S. PATENT DOCUMENTS

| | | |
|---|---|---|
| 2007/0231244 A1 | 10/2007 | Shah et al. |
| 2008/0173584 A1 | 7/2008 | White et al. |
| 2012/0277327 A1 | 11/2012 | Han et al. |
| 2012/0292574 A1* | 11/2012 | Terrien ................ F25J 3/0223 252/373 |
| 2012/0301391 A1 | 11/2012 | Basini et al. |
| 2013/0205746 A1 | 8/2013 | Allam et al. |
| 2016/0363368 A1 | 12/2016 | Zanganeh et al. |
| 2018/0128172 A1 | 5/2018 | Allam |
| 2018/0363550 A1 | 12/2018 | Allam et al. |
| 2019/0135626 A1 | 5/2019 | Rafati et al. |
| 2019/0337801 A1 | 11/2019 | Ulber et al. |
| 2020/0172395 A1 | 6/2020 | Choi et al. |
| 2020/0307997 A1 | 10/2020 | Trainier |
| 2020/0368667 A1 | 11/2020 | Obata et al. |
| 2020/0406212 A1 | 12/2020 | Mortensen et al. |
| 2021/0139794 A1 | 5/2021 | Mukthiyar et al. |
| 2021/0155478 A1 | 5/2021 | Shrivastava et al. |
| 2021/0179425 A1 | 6/2021 | Ott |
| 2021/0252471 A1 | 8/2021 | Park |
| 2021/0300757 A1 | 9/2021 | Tadiello et al. |
| 2021/0323818 A1 | 10/2021 | Rafati et al. |
| 2021/0395085 A1 | 12/2021 | Paglieri et al. |
| 2022/0040626 A1 | 2/2022 | Coleman et al. |
| 2022/0048768 A1 | 2/2022 | Schmidt et al. |
| 2022/0089437 A1 | 3/2022 | Shrivastava et al. |
| 2022/0099003 A1 | 3/2022 | Lu et al. |
| 2022/0136700 A1 | 5/2022 | Strand et al. |
| 2022/0143549 A1 | 5/2022 | Bauer et al. |
| 2022/0144634 A1 | 5/2022 | Schmidt et al. |
| 2022/0168687 A1 | 6/2022 | Hill |
| 2022/0169500 A1 | 6/2022 | Ko |
| 2022/0169501 A1 | 6/2022 | Matsuo et al. |
| 2022/0185666 A1 | 6/2022 | Streb et al. |
| 2022/0194789 A1 | 6/2022 | Christensen et al. |
| 2022/0203297 A1 | 6/2022 | Lu et al. |
| 2022/0212925 A1 | 7/2022 | Albuali et al. |
| 2022/0212926 A1 | 7/2022 | Wedhaya et al. |
| 2022/0212927 A1 | 7/2022 | Bamagain et al. |
| 2022/0212928 A1 | 7/2022 | Østberg et al. |
| 2022/0212949 A1 | 7/2022 | Fadhel et al. |
| 2022/0219975 A1 | 7/2022 | Feinstein |
| 2022/0219978 A1 | 7/2022 | Tewari et al. |
| 2022/0234018 A1 | 7/2022 | Mackic et al. |
| 2022/0259042 A1 | 8/2022 | Ravikumar et al. |
| 2022/0267147 A1 | 8/2022 | Ravikumar et al. |
| 2022/0306463 A1 | 9/2022 | Cruz et al. |
| 2022/0306464 A1 | 9/2022 | Cruz et al. |
| 2022/0306468 A1 | 9/2022 | Cady et al. |
| 2022/0331768 A1 | 10/2022 | Ko |
| 2023/0002224 A1 | 1/2023 | Younes et al. |
| 2023/0042457 A1 | 2/2023 | Allam et al. |
| 2023/0061332 A1 | 3/2023 | Stroffolino, IV |
| 2023/0089656 A1 | 3/2023 | Galliot et al. |
| 2023/0104475 A1 | 4/2023 | Nam et al. |
| 2023/0105183 A1 | 4/2023 | Nam et al. |
| 2023/0107936 A1 | 4/2023 | You et al. |

FOREIGN PATENT DOCUMENTS

| | | |
|---|---|---|
| DE | 10 2009 032 718 | 2/2011 |
| JP | S5677673 | 6/1981 |
| JP | H04359785 | 12/1992 |
| KR | 10-2011-0133782 | 12/2011 |
| WO | WO 2009/105305 | 8/2009 |
| WO | WO 2010/103259 | 9/2010 |
| WO | WO 2010/109184 | 9/2010 |
| WO | WO 2012/123752 | 9/2012 |
| WO | WO 2021/055185 | 3/2021 |
| WO | WO 2021/055186 | 3/2021 |
| WO | WO 2021/075802 | 4/2021 |
| WO | WO 2021/083776 | 5/2021 |
| WO | WO 2021/117875 | 6/2021 |
| WO | WO 2021/175662 | 9/2021 |
| WO | WO 2021/189137 | 9/2021 |
| WO | WO 2021/223733 | 11/2021 |
| WO | WO 2021/257944 | 12/2021 |
| WO | WO 2022/003313 | 1/2022 |
| WO | WO 2022/034283 | 2/2022 |
| WO | WO 2022/034284 | 2/2022 |
| WO | WO 2022/034285 | 2/2022 |
| WO | WO 2022/038090 | 2/2022 |
| WO | WO 2022/040677 | 2/2022 |
| WO | WO 2022/100899 | 5/2022 |
| WO | WO 2022/106058 | 5/2022 |
| WO | WO 2022/145618 | 7/2022 |
| WO | WO 2022/173263 | 8/2022 |
| WO | WO 2022/180740 | 9/2022 |
| WO | WO 2022/219822 | 10/2022 |
| WO | WO 2022/229838 | 11/2022 |
| WO | WO 2022/241593 | 11/2022 |
| WO | WO 2022/253460 | 12/2022 |

\* cited by examiner

SYSTEMS AND METHODS FOR PRODUCTION AND SEPARATION OF HYDROGEN AND CARBON DIOXIDE

CROSS-REFERENCE TO RELATED APPLICATIONS

The present application is a divisional of U.S. patent application Ser. No. 16/185,188, filed Nov. 9, 2018, which claims priority to U.S. Provisional Patent Application No. 62/583,816, filed Nov. 9, 2017, and U.S. Provisional Patent Application No. 62/670,175, filed May 11, 2018, the disclosures of which are incorporated herein by reference.

FIELD OF THE INVENTION

The present disclosure provides systems and methods for producing materials that are typically gaseous at standard temperature and pressure, such as hydrogen and carbon dioxide. In particular, the present disclosure provides for separation of carbon dioxide from an industrial process stream, and specifically from a process stream that further includes hydrogen.

BACKGROUND

Hydrogen has long been viewed as a desirable energy source because of its clean combustion characteristics producing only water. Hydrogen can be produced from hydrocarbon fuels with capture of $CO_2$ avoiding any $CO_2$ emission to the atmosphere. Hydrogen can be a desirable commodity for use in fuel cells (particularly in vehicle production), heating applications, oil refining, fertilizer production, and other chemical production. For example, hydrogen can be used as a fuel for electric vehicle propulsion using fuel cells advantageously coupled to high capacity electric storage batteries. Beneficially, use of hydrogen as a fuel can eliminate $CO_2$, NOx, CO, and hydrocarbon emissions and thus significantly reduce air pollution particularly at ground level in large urban conurbations. Any path to implementation of a hydrogen-based world economy, however, would require a very large hydrogen production capacity. Moreover, such hydrogen production method would need to be capable of achieving simultaneously low hydrogen production cost together with the capture of near 100% of the $CO_2$ and other impurities derived from any carbonaceous or hydrocarbon fuel utilized.

Hydrogen use as a fuel source can also be beneficial to reduce or eliminate carbon dioxide emissions associated with more conventional power production processes. For example, hydrogen can be diluted with nitrogen and/or steam and used as the fuel in a gas turbine combined cycle power generation system.

Gas turbine combined cycle power generation systems are a major source of electrical power generation worldwide because of their ability to produce power from natural gas with an efficiency in the range of 55% to 62%, on a lower heating value (LHV) basis. Despite the desirable efficiency, such systems are still problematic since the carbon in the fuel is emitted to the atmosphere as carbon dioxide. To overcome this problem and capture the $CO_2$ derived from fuel combustion a number of possibilities have been suggested. It is possible to operate the gas turbine with $CO_2$ in place of air as the working fluid by recycling the turbine exhaust back to the gas turbine compressor inlet following cooling to generate steam for additional power production. The fuel for the gas turbine is burned with pure oxygen in an oxy-fuel burner so that all atmospheric nitrogen is eliminated from the closed cycle system and $CO_2$ becomes the working fluid in the gas turbine. The product $CO_2$ derived from fuel combustion together with condensed water are removed upstream of the inlet of the gas turbine compressor section. Chemical and/or physical solvent scrubbing processes can be used to treat the gas turbine exhaust to remove $CO_2$. As discussed above, it is possible to eliminate the emissions of $CO_2$ and other fuel and combustion derived pollutants from the gas turbine exhaust by utilizing hydrogen as the fuel in the gas turbine. This approach requires a consistent high volume low cost hydrogen source that is preferentially provided from a system in which substantially all the $CO_2$ and other fuel or combustion derived impurities are removed for separate disposal. Hydrogen production in excess of that required for gas turbine fuel can be provided from such a system for use in the wider applications for hydrogen as a fuel described above.

Other industrial processes are also known that utilize significant amounts of hydrogen gas while also being significant emitters of $CO_2$. Modern refineries, for example, utilize (on average) approximately 250 scf of $H_2$ per barrel of oil that is processed. Steam methane reforming (SMR), which is the main process currently being used for $H_2$ generation, has a $CO_2$ intensity of 24.5 kg-$CO_2$/kscf-$H_2$ which results in 6.1 kg-$CO_2$ being emitted per barrel of oil processed, this amount being attributed solely to the use of $H_2$ in hydrotreating/hydrocracking processes. The overall $CO_2$ emission per barrel is higher than this and ranges from 6.5-33 kg-$CO_2$/barrel of oil processed.

Much of the world's power is derived from the combustion of coal in steam cycle power plants. Methods of $CO_2$ removal from a power boiler include coal combustion with pure oxygen in an oxy-fuel burner diluted with recycle flue gas so that nitrogen is largely eliminated from the system and net $CO_2$ product derived from the coal can be produced for disposal. Alternatively the stack gas can be treated with limestone slurry to remove sulfur dioxide followed by the removal of $CO_2$ from the stack gas using an amine chemical scrubbing process.

A further method of using coal or other solid or heavy liquid fuels such as refinery waste products or biomass is to gasify the fuels using pure oxygen in a partial oxidation reactor followed by gas treating to convert CO by reaction with steam in a catalytic reactor giving hydrogen and $CO_2$ then removal of $CO_2$ and sulfur compounds and other trace impurities giving a substantially pure hydrogen product for use as clean fuel in a combined cycle gas turbine power generation system.

A further method of power generation using natural gas, coal, refinery waste, or biomass fuel would involve the use of a closed cycle high pressure oxy-fuel power generation system using a working fluid, such as $CO_2$, $N_2$, Helium, $H_2O$, or the like. For example, systems utilizing $N_2$ as the working fluid are described in U.S. Pat. Nos. 9,410,481 and 9,611,785, the disclosures of which are incorporated herein by reference.

In light of the significant amounts of $CO_2$ produced in various industrial gas streams, such as those exemplified above, there is a need for various processes for $CO_2$ removal from process streams. Separation and purification of carbon dioxide from industrial waste gas streams is a challenging process due to high energy and equipment costs. Currently, climate change due to global warming is an existential threat to humanity and release of significant amount of carbon dioxide to the atmosphere due to human activities (industry, transportation, residential, etc.) has been known as the main reason behind it. Thus, development of novel and efficient ways to capture and sequester or reuse the $CO_2$ emission from various industrial processes is of paramount importance. For example, global hydrogen generation capacity in 2017 was about 65M metric tons, and about 99% of that amount was produced through processes that release about 0.74 Gt/year of $CO_2$ into the atmosphere. This was more than 2% of overall global $CO_2$ emission in 2017 which was only due to hydrogen generation.

Known methods for removal of carbon dioxide from gas streams include absorption of carbon dioxide using a chemical solvent such as an amine solution of a physical solvent such as the Selexol™ process, separation using membrane diffusion, and separation using adsorption on a solid adsorbent, such as a zeolite or activated carbon. Fuel gas streams containing $CO_2$ are often burned releasing $CO_2$ into the atmosphere, and known methods for separation of $CO_2$ from gas streams are recognized as being prohibitively costly. Accordingly, there is a need for lower cost $CO_2$ removal systems which can easily be integrated into existing processes such as hydrogen generation, capable of 100% $CO_2$ recovery.

Hydrogen production systems using any hydrocarbon or carbonaceous fuel will in general require a large quantity of high temperature heat (e.g., about 500° C. to about 1000° C.) for feed preheating, and they produce large quantities of excess heat at low temperatures (e.g., about 200° C. to about 400° C.). Power stations have high grade heat available, and they can utilize low grade heat integrated into their systems. Because of the desirability of the use of hydrogen as a fuel source, there remains a need for means to provide hydrogen fuel at a low cost substantially without $CO_2$ emission to the atmosphere.

Previous efforts have been undertaken to provide for combined production of hydrogen and carbon dioxide, such as disclosed in U.S. Pat. No. 8,021,464. Such methods, however, and lacking in simplicity and cost efficiency. Accordingly, there remains a need for further systems and methods for removing carbon dioxide from process streams as well as simultaneously producing a valuable hydrogen stream.

SUMMARY OF THE INVENTION

The present disclosure relates to systems and methods for providing one or more streams of a substantially pure chemical compound, such as hydrogen and/or carbon dioxide. The disclosed systems and methods beneficially utilize an auto-refrigeration system that efficiently separated carbon dioxide from an industrial process stream at reduced cost. As such, in some embodiments, the present disclosure particularly can provide systems and methods for production of a carbon dioxide stream, specifically through separation of the carbon dioxide from an industrial stream including carbon dioxide and at least one further material. Such carbon dioxide separation can be particularly beneficial for use with systems and methods that produce a stream comprising hydrogen and carbon dioxide. Accordingly, in some embodiments, the present disclosure particularly can provide systems and methods for production of substantially pure hydrogen gas, such systems and methods include removal of carbon dioxide from a crude hydrogen product stream, such as through the auto-refrigeration methods described further herein.

Hydrogen production can comprise partially oxidizing or reacting a hydrocarbon fuel with oxygen in the presence of steam and or $CO_2$ to provide gaseous products that include and/or are converted into hydrogen. Moreover, because of the ability to efficiently remove $CO_2$ at a significantly reduced cost, the hydrogen can be produced with substantially zero $CO_2$ and other impurity emissions, and the hydrogen can be produced in a substantially pure form so that it can be utilized in a variety of manners, such as being use as a vehicle fuel, being used for power production or for heating, being used for production of fertilizer or other chemicals, or being used in oil refining.

In some embodiments the present disclosure can include the production of a mixture of $H_2$+CO using a single stage catalytic reactor with steam plus natural gas feeds, such as via steam methane reforming (SMR). Alternatively $H_2$+CO can be produced by the partial oxidation of a gaseous or liquid or solid hydrocarbon or carbonaceous fuel using pure oxygen (PDX) or from a catalytic auto-thermal reactor (ATR) using a gaseous or liquid hydrocarbon fuel with $O_2$ plus steam feed. In some preferred embodiments, the present disclosure further can relate to systems and methods for generation of $H_2$+CO in a PDX or ATR reactor followed by the use of a gas heated reformer (GHR) in either a series or parallel mode to the PDX or ATR reactor to produce additional $H_2$ and CO (i.e., synthesis gas) by utilizing the exhaust sensible heat in the PDX and/or ATR reactor system to provide the heat for endothermic catalytic steam plus hydrocarbon reforming reactions taking place in the GHR. As an example using natural gas fuel, the PDX reactor has an exit temperature of about 1300° C. to about 1450° C. while an ATR reactor exit temperature is about 1000° C. to about 1100° C. The outlet temperature of the GHR reactor is between 550° C. and 650° C. The significantly lower exit temperature results in the an increase in the production of hydrogen of between 35% and 40% for a PDX+GHR combination compared to a PDX reactor alone, both systems using the same quantity of hydrocarbon feed and where the extra heat available from the PDX product gas stream is used not for hydrogen production but to produce steam for power production in an associated power system. A further advantage of the two stage syngas production system is its ability to operate at syngas delivery pressures up to 100 bar with less than 5% unconverted methane from the feed hydrocarbon fuel present in the product syngas stream. System components suitable for carrying out a two stage syngas production method are described in U.S. Pat. Nos. 9,327,972 and 8,685,358, the disclosures of which are incorporated herein by reference. Hydrogen production should be maximized due to its much higher value compared to power production using excess steam.

The present disclosure further can provide for $CO_2$ capture in conventional $H_2$ systems, such as SMR. The state of art SMR system with $CO_2$ capture typically rely on the use of $H_2$-PSA waste gas as the fuel and the use of an AGR-based $CO_2$ separation unit on the exhaust of the SMR furnace. Such a system typically captures up to 90% of overall $CO_2$ from the process and produces $H_2$ that is about 45% more expensive than $H_2$ without CCS.

In one or more embodiments, the present systems and methods can utilize the unavoidable excess heat generated in the hydrogen plant (e.g., at a temperature level below 400° C.) to provide additional heat input to other systems and methods that optionally may be combined with the hydrogen production system. For example, the excess heat from the hydrogen production can be added to a power production system and method to improve efficiency of such system and method. Hydrogen production systems commonly use a CO shift reactor to convert CO+$H_2O$ to $H_2$+$CO_2$ with heat release so that in cooling the crude $H_2$ product stream to ambient temperature prior to purification there is a very large heat release at relatively low temperature level due to the sensible heat of the gas stream and the latent heat of condensation of the excess steam present which can ideally be used as an added heat source to other systems. Such added heat can be beneficial, as one example, to assist in achieving high electrical generation efficiency in a power production system.

In other embodiments, the present disclosure encompasses the provision of heat to the hydrogen production system. In particular, heat can be added to the hydrogen production system (e.g., at a temperature level of about 400° C. to about 1000° C.) and can be useful specifically for superheating one or both of a fuel stream (e.g., natural gas) and a steam feed stream to an $H_2$+CO synthesis gas generation reactor system (e.g., any one or more of an SMR, a PDX, an ATR, a PDX+GHR, or an ATR+GHR). The added heat that is input to the hydrogen production system can be provided from a variety of sources including, but not limited to, power production systems where high temperature combustion product streams are available.

In further embodiments, the hydrogen production system can include a steam generating boiler that can be useful for cooling the product gas from the $H_2$+CO reactor system and producing high pressure saturated steam, which can be superheated using high temperature heat derived from a different source. The superheated steam together with preheated hydrocarbon feed can then provide the feed to the $H_2$+CO reactor units. Any excess steam production can then be transferred to a further system. The $H_2$+CO syngas leaving the steam generating waste heat boiler (WHB) contains a substantial fraction of steam. It is then passed through a catalytic shift reactor where the steam combines with the CO in an endothermic reaction to produce $H_2$ and $CO_2$. The crude hydrogen stream must be cooled to near ambient temperature from a typical high temperature level of about 400° C. The sensible heat rejected plus the additional heat produced from the condensation of the residual steam content produces a considerable excess heat release available after preheating $H_2$ reactor boiler feed water and reactor feed streams to a close temperature approach to the syngas stream leaving the steam generator. This excess heat can be transferred to a further system. Note that optionally a second lower temperature catalytic shift reactor can be used to maximize $H_2$ production. The present systems and methods can utilize a pressure swing adsorption (PSA) system to separate pure high pressure hydrogen from a cooled, crude hydrogen stream. The waste gas stream from the PSA unit at a pressure of about 1.2 bar to about 1.6 bar contains all the $CO_2$ produced from conversion of the hydrocarbon feed to $H_2$ together with $CH_4$+CO+$H_2$, and it is saturated with water vapor.

In additional embodiments, the present disclosure can provide for the recovery of substantially all the carbon present in the fuel for the hydrogen plant as $CO_2$, which can be compressed to pipeline pressure in the range of about 100 bar to about 200 bar for disposal. For example, this can be achieved by treating the ambient temperature crude $H_2$ stream in an amine $CO_2$ scrubbing system upstream of the PSA. The waste gas from the PSA can then be used as a minor portion of a fuel stream consumed in a combined or separate system. The disadvantage of the amine $CO_2$ removal system is its high capital cost and the large quantity of low pressure steam required for amine regeneration to produce the pure $CO_2$ product stream. The PSA waste gas stream contains a significant quantity of $H_2$+CO. The waste gas can be compressed, and with added steam, passed through a catalytic CO shift reactor which results in the cooled compressed waste gas stream having a $H_2$ molar concentration in the range of about 60% to about 85%. This stream can then be processed in a second PSA unit giving an additional $H_2$ production. This combination of amine scrubbing plus first stage PSA plus CO shift plus second stage PSA results in an overall ratio of $H_2$ product divided by ($H_2$+CO) present in the syngas reactor product stream of greater than 95% and preferably greater than 97%. The hydrogen production system can preferably be configured so that a monoethanolamine (MEA) unit or a physical solvent $CO_2$ removal unit upstream of the first PSA is eliminated leaving all the $CO_2$ in the PSA waste gas stream.

Following compression and drying, this stream can be cooled to a temperature in the range of about 2° C. to about 10° C. above the $CO_2$ freezing temperature at which point the separation of the liquid phase and the vapor phase will result in greater than 70% and preferably greater than 80% of the $CO_2$ being removed as a liquid. Optionally the liquid $CO_2$ can be treated in a stripping distillation column to remove dissolved $H_2$+CO+$CH_4$ which will be transferred to the vapor phase. The process is described in U.S. Pat. No. 7,819,951, which is incorporated herein by reference. Other $CO_2$ removal systems including components that may be incorporated herein are disclosed in U.S. Pat. Nos. 8,021,464 and 8,257,476, the disclosures of which are incorporated herein by reference. The separated vapor stream which is within 2 bar of the waste gas compressor discharge pressure is then warmed to atmospheric temperature, optionally passed through a CO shift catalytic reactor system with some added steam and treated as before in a second PSA unit which delivers $H_2$ at the same purity and pressure as the first PSA unit. A further preferred arrangement is to take the ambient temperature-gas stream separated from the bulk of the $CO_2$, in the low temperature $CO_2$ removal system and recycle it back to the feed streams for the $H_2$+CO synthesis gas generation reactor. By closing the recycle loop completely, inert components can be vented from the system, and this vented fuel gas stream can be consumed in a combined or separate system. The level of argon derived from the oxygen stream and nitrogen derived from both the hydrocarbon feed and the oxygen streams must be kept at a low total concentration of from 3% to 12% (molar) in the feed gas to the first PSA. This arrangement does not require a second CO shift and PSA system. All the hydrogen will be produced from the main PSA while all the $CO_2$ will be produced from the low temperature $CO_2$ removal system.

If desired, part or all of the oxygen used in the present systems and methods can be supplied from a cryogenic air separation plant or from a high temperature oxygen ion transport membrane (ITM) unit which has a low-pressure air feed. The oxygen can be produced from the ITM unit as a product $O_2$ gas stream or it can immediately react with a fuel gas such as natural gas mixed with a suitable diluent such as $CO_2$ in an ITM oxy-fuel combustor or diluted with steam to produce $H_2$+CO syngas in an ITM reactor. The hydrogen plant can utilize a stream of high pressure gaseous oxygen at pressures up to 105 bar as feed to the $H_2$+CO synthesis gas generation reactor producing substantially pure $H_2$ at up to 95 bar from the PSA system. A cryogenic air separation plant supplying high pressure oxygen can be particularly useful to provide the oxygen.

In one or more embodiments, the hydrogen production system and method can be combined with a power production system and method in order to improve efficiency of both systems. For example, in some embodiments, a pulverized coal fired power station generating high pressure superheated steam for turbines has available in the convection section flue gas leaving the super-heaters at temperatures in excess of 800° C. The feed streams of hydrocarbon gas and steam for the syngas generation reactors can be superheated to temperatures in the range 400° C. to 600° C. The low level excess heat available from the $H_2$ production system can be used to heat part of the power station boiler feed water releasing steam which would normally be used for extra power production in the steam turbines. $CO_2$ removal in the power station would need to use either amine scrubbing of the stack gas or the use of oxy-fuel coal combustion with recycle of flue gas followed by $CO_2$ purification based on established technology.

As a further example, a gas turbine combined cycle power generation system uses a hydrocarbon fuel, usually natural gas, which is burned in the gas turbine combustor. The fuel can be hydrogen which would generally be diluted with nitrogen or steam to reduce adiabatic flame temperature. The integration with the hydrogen production system is particularly advantageous since it is possible not only for heat integration to take place but also for the hydrogen production to be sufficiently high to provide all the hydrogen fuel gas required by the gas turbine and also excess hydrogen for other uses. The integration not only increases efficiency but also eliminates near 100% of the $CO_2$ derived from combustion of the total hydrocarbon feed to the system. This is a very large improvement on the current system for $CO_2$ removal based on amine scrubbing of $CO_2$ from the gas turbine outlet stream. The syngas reactor feed streams can be preheated against the gas turbine exhaust which for an industrial unit is in the temperature range of about 500° C. to about 620° C. The low temperature heat released from the hydrogen plant can be used for boiler feed-water preheating releasing stem for extra power production in the steam turbine.

In one or more embodiments, the present disclosure can provide a hydrogen production system that can be configured for integration with a further system that is configured to provide added heat to the hydrogen production system. In particular, the system can comprise: a $CO+H_2$ syngas reactor operating, for example, at up to 110 bar pressure with feed streams of hydrocarbon fuel, steam, and optionally waste fuel gas plus $CO_2$, (preferably wherein the reactor system can comprise one or more of an SMR, a PDX, an ATR, a PDX+GHR, or an ATR+GHR); a waste heat boiler configured to cool syngas produced in the reactor system and produce saturated high pressure steam; a super-heater, which elevates the temperature of the reactor feed streams to a temperature in the range of about 400° C. to about 600° C.; one or more catalytic CO shift reactors, which convert CO by reaction with contained steam to produce $H_2+CO_2$; a heat exchanger system configured to cool the syngas and condense excess steam, which provides heat required for preheating boiler feed water and optionally syngas reactor feed streams to a temperature of up to about 400° C.; a first pressure swing $H_2$ purification unit (PSA) producing substantially pure $H_2$ product at a pressure within about 5 bar of the syngas reactor outlet pressure and a waste gas steam at a pressure of about 1.2 bar to about 1.6 bar; optionally a chemical or physical absorbent $CO_2$ removal system placed upstream of the first PSA unit; a compressor to compress the PSA waste gas stream to a pressure of about 2 bar to about 5 bar higher than the first PSA $H_2$ product stream; optionally a catalytic CO shift reactor system using added steam to convert CO in the compressed waste gas by reaction with steam to $H_2+CO_2$; a second PSA, which processes the waste gas stream which contains more than 60% molar $H_2$ concentration to produce a second substantially pure $H_2$ product stream at substantially the same pressure as the first $H_2$ product stream; and an outlet line for output of the waste fuel gas stream from the second PSA. In some embodiments, the system may include one or more lines for transfer of excess heat available from the syngas cooling duty and/or one or more lines for output of any excess steam or waste fuel gas from the $H_2$ production system. Optionally, the $CO_2$ removal system upstream of the first PSA unit may be eliminated. Further, optionally, the use of a $CO_2$ removal unit based on the principle of cooling the compressed and dried first PSA waste gas steam to within a temperature of 2° C. to 10° C. of the $CO_2$ freezing temperature and separating the liquid $CO_2$ from the residual waste gas stream with provision for purifying the $CO_2$ may also be eliminated. Also, optionally, the waste gas from the first PSA unit following waste gas compression and $CO_2$ removal can be recycled for use as part of the fuel gas feed to the syngas reactors. In order to prevent a build-up of inert argon plus nitrogen in the closed cycle loop according to such embodiments, there will be a purge gas stream taken conveniently upstream of the first PSA to limit the concentration of inerts to about 3% to about 12% (molar) concentration.

The integration of the hydrogen production system with a gas turbine combined cycle power generation system will, in addition to heat integration, use at least a portion of the produced hydrogen to provide all of the fuel gas required to power the gas turbine. The hydrogen will be suitably diluted with nitrogen derived from the cryogenic $O_2$ plant providing oxygen for the PDX+GHR or the ATR+GHR syngas reactors and also, optionally, with excess heat and steam at a temperature level below 400° C. derived from the hydrogen production system. This will result in the near 100% recovery of $CO_2$ derived from combustion of the total hydrocarbon feed to the $H_2$ production plus the power production systems.

In one or more embodiments, the present disclosure provides a simple and economic process to capture and purify $CO_2$ as a by-product from waste streams generated from various processes such as oxy-fuel combustion and power generation, natural gas processing, and hydrogen generation. The systems and methods can be potentially utilized to purify and separate $CO_2$ from any industrial waste stream wherein an impure stream of $CO_2$ with at least 40 mol % $CO_2$ content exist or where lower concentration of $CO_2$ can be upgraded to at least 40 mol % concentration.

The presently discloses systems and methods can utilize known refrigeration methods to separate the contaminants in a process waste stream from $CO_2$. The present systems and methods, however, can utilize a unique arrangement of equipment that greatly simplifies the process and thus the cost of separation of purification of $CO_2$. The present systems and methods are particularly useful when integrated with a hydrogen production plant in which the hydrocarbon feed is converted to $H_2+CO$ in a pressurized system by reaction with oxygen and steam and in which the process integration between the $H_2$ production and $CO_2$ removal units achieves substantially 100% $CO_2$ capture.

In one or more embodiments, the present disclosure can be configured to generate a purified and clean $CO_2$ stream from a $CO_2$ containing process waste stream using refrigeration and fractionation. Briefly, the impure $CO_2$ stream is cooled down to a temperature near the $CO_2$ triple point (−56.4° C.) to liquefy the $CO_2$ content followed by separation and purification in a mass transfer column. The process can be integrated with a pressurized hydrogen production system with internal transfer streams to achieve efficient low cost 100% $CO_2$ capture.

In some embodiments, the present disclosure relates to a process for separating $CO_2$ from contaminating components comprising methane, carbon monoxide, hydrogen, nitrogen, argon, oxygen, and water vapor characterized by a mass transfer separation column system for processing an impure liquid carbon dioxide stream at a temperature close to the freezing point of $CO_2$ to produce contaminant-enriched overhead vapor and carbon dioxide-enriched bottoms liquid product stream.

The separation column can have a reboiler for boiling a portion of the carbon dioxide-enriched bottoms liquid by indirect heat exchange against cooling impure carbon dioxide fluid to produce cooled impure carbon dioxide fluid for feeding and condensing said column system and warmed carbon dioxide-enriched fluid.

The disclosed systems and methods can comprise a heat exchanger for further cooling impure carbon dioxide fluid by indirect heat exchange to produce partially condensed impure carbon dioxide fluid.

The discloses systems and methods can comprise a first pressure reduction arrangement for reducing the pressure of impure liquid carbon dioxide to produce reduced pressure impure liquid carbon dioxide which is within 10° C. of the freezing point of the impure carbon dioxide liquid.

The discloses systems and methods can comprise further pressure reduction arrangements for expanding portions of the carbon dioxide enriched bottoms liquid to produce expanded carbon dioxide-enriched bottoms liquid streams at reduced pressure to be used as refrigerant streams to cool the impure carbon dioxide feed stream.

The impure carbon dioxide feed stream can be at least a portion of the waste gas stream from a first $H_2$ PSA train placed upstream of the $CO_2$ separation and purification step.

The pressure of the impure feed stream can be increased to give a $CO_2$ partial pressure of at least 15 bar.

At least a portion of the overhead vapor from the mass transfer column in the $CO_2$ separation system can be optionally compressed and recycled back to the $H_2$ plus CO syngas generation system of a pressurized hydrogen plant.

Overhead vapor from the mass transfer column can be optionally compressed and recycled back to a combined syngas generator equipment, comprised of a partial oxidation zone, a gas heated reformer zone, and waste heat boiler heat recovery heat exchanger.

The compressed overhead vapor from the separation column can be processed in a second $H_2$ PSA unit recovering at least 60 mol % of the $H_2$ in the separation column waste gas as a second $H_2$ product stream.

The $CO_2$ mass transfer column overhead vapor can be processed to catalytically react contained carbon monoxide with steam to produce additional hydrogen in a low temperature water-gas shift reactor to increase its $H_2$ content to at least 60% on a mole basis prior to the second $H_2$ PSA train.

At least a portion of the waste gas from the second $H_2$ PSA unit can be mixed with the waste gas from the first $H_2$ PSA and recycled back to the $CO_2$ separation train.

At least a portion of $CO_2$ separation train waste gas can be used as a fuel in a gas turbine, process heater, or an oxy-fuel burner.

At least a portion of the second $H_2$ PSA waste gas can be used as a fuel source for any purpose including in a gas turbine, process heater, an oxy-fuel burner, or the furnace of a steam methane reforming reactor (SMR).

In all cases, the produced $CO_2$ can be compressed to pipeline pressure for delivery to a suitable sequestration site.

In example embodiments, the present disclosure can provide a process for separating carbon dioxide ($CO_2$) from a process stream comprising $CO_2$ and one or more further components. In particular, the process can comprise: providing the process stream at a pressure such that a partial pressure of the $CO_2$ in the process stream is at least 15 bar; drying the process stream sufficiently so that a dew point of the process stream comprising the $CO_2$ is reduced to a temperature of about −20° C. or less; cooling the process stream in at least one heat exchanger to provide the process stream comprising the $CO_2$ as a two phase stream; expanding the two phase stream so as to reduce the temperature of the two phase stream to a temperature that is within about 15° C. of a freezing point of the two phase stream; and separating the two phase stream to provide a vapor stream enriched with at least one of the one or more further components and to provide a liquid stream that is enriched with the $CO_2$. In one or more further embodiments, the process can be further characterized in relation to one or more of the following statements, which may be combined in any number and order.

The drying can comprise passage of the process stream comprising the $CO_2$ through a desiccant-packed bed.

The cooling can comprise cooling the process stream against at least a portion of the liquid stream that is enriched with the $CO_2$.

The cooling can comprise cooling the process stream in a first heat exchanger and in a second heat exchanger.

The cooling can comprise cooling the process stream in the first heat exchanger against a first portion of the liquid stream that is enriched with the $CO_2$ and cooling the process stream in the second heat exchanger against a second portion of the liquid stream that is enriched with the $CO_2$.

The process further can comprise expanding the first portion of the liquid stream that is enriched with the $CO_2$ and the second portion of the liquid stream that is enriched with the $CO_2$ so as to reduce the temperature of the first portion of the liquid stream that is enriched with the $CO_2$ and the second portion of the liquid stream that is enriched with the $CO_2$ prior to cooling the process stream in the first heat exchanger against the first portion of the liquid stream that is enriched with the $CO_2$ and cooling the process stream in the second heat exchanger against the second portion of the liquid stream that is enriched with the $CO_2$.

The first portion of the liquid stream that is enriched with the $CO_2$ and the second portion of the liquid stream that is enriched with the $CO_2$ can be separately expanded using separate valves.

The process further can comprise cooling the process stream in a reboiler heat exchanger.

The process further can comprise passing at least a portion of the liquid stream that is enriched with the $CO_2$ through the reboiler heat exchanger.

The cooling can comprise cooling the process stream against at least a portion of the vapor stream enriched with at least one of the one or more further components.

The process can comprise expanding the two phase stream so as to reduce the temperature of the two phase stream to a temperature that is within about 10° C. or about 5° C. of the freezing point of the two phase stream.

The separating the two phase stream can comprise passing the two phase stream through a distillation column.

The distillation column can include a stripping section below a feed point of the two phase stream into the distillation column and includes a rectifying section above the feed point of the two phase stream into the distillation column.

The process can comprise separating the liquid stream that is enriched with the $CO_2$ into a first liquid $CO_2$ stream, a second liquid $CO_2$ stream, and a third liquid $CO_2$ stream.

The process can comprise independently expanding one, two, or three of the first liquid $CO_2$ stream, the second liquid $CO_2$ stream, and the third liquid $CO_2$ stream so as to reduce a temperature thereof and form a refrigerant stream.

The process can comprise compressing one, two, or three of the first liquid $CO_2$ stream, the second liquid $CO_2$ stream, and the third liquid $CO_2$ stream.

The process can comprise compressing the vapor stream enriched with at least one of the one or more further components.

The one or more further components can be one or more of a hydrocarbon, carbon monoxide, hydrogen, nitrogen, argon, and water vapor.

The process can comprise expanding the vapor stream enriched with at least one of the one or more further components so as to reduce a temperature thereof and form a refrigerant stream.

The process can comprise passing at least a portion of the vapor stream enriched with at least one of the one or more further components through a pressure swing absorber unit.

The passing can be effective to recover at least 60 mol % or at least 75 mol % of any $H_2$ present in the vapor stream enriched with at least one of the one or more further components.

The process can comprise recycling at least a portion of the vapor stream enriched with at least one of the one or more further components for combination with the process stream prior to said drying step. For example, at least a portion of the waste gas from the low temperature $CO_2$ removal system and/or a second PSA can be recycled back to a GHR in a hydrogen production process. As another example, at least a portion of the waste gas from the low temperature $CO_2$ removal system and/or a second PSA can be recycled back to a PDX reactor in a hydrogen production process. As still another example, at least a portion of the waste gas from the low temperature $CO_2$ removal system and/or a second PSA can be recycled back to a combined reactor in a hydrogen production process. Such combined reactor can be a reactor unit that is a combined pressure vessel comprised of a partial oxidation zone at the bottom, a gas heated reformer zone with open-ended tubes in the middle, and a waste heat boiler heat exchanger at the top. In such configuration, a single combined syngas stream and superheated steam can be main products leaving the pressure vessel.

The process stream can be an $H_2+CO_2$ stream from a hydrogen production process.

The process can be carried out without using an external refrigerant.

In example embodiments, the present disclosure particularly can provide a carbon dioxide ($CO_2$) separation system. In particular, such system can comprise: a compressor configured for compressing a process stream, wherein the process stream comprises $CO_2$ and one or more further components; a drier configured for removing moisture from the process stream; at least one heat exchanger configured for cooling the process stream against one or more cooling streams and providing the process stream as a two-phase stream; at least one expander configured for cooling the two-phase stream via expansion of the two-phase stream; and a mass transfer column configured to receive the two phase stream and generate a vapor phase stream and a liquid phase stream.

In example embodiments, the present disclosure can provide a hydrogen production system. In particular, such hydrogen production system can comprise: a reactor unit configured for receiving a hydrocarbon feed stream and oxygen and forming a product gas stream comprising $H_2+CO$; a steam generating boiler configured for cooling the product gas stream comprising $H_2+CO$ and for forming steam; at least one reactor configured for receiving the product gas stream comprising $H_2+CO$ and providing a stream comprising $H_2+CO_2$; a pressure swing adsorber configured to receive the stream comprising $H_2+CO_2$ and provide a product stream formed of substantially pure hydrogen and also provide waste gas steam comprising $CO_2$; a compressor configured for compressing the waste gas stream comprising the $CO_2$; a drier configured for removing moisture from the waste gas stream comprising the $CO_2$; at least one heat exchanger configured for cooling the waste gas stream comprising the $CO_2$ against one or more cooling streams and providing the waste gas stream comprising the $CO_2$ as a two-phase stream; at least one expander configured for cooling the two-phase stream via expansion of the two-phase stream; and a separator configured for separating the two-phase stream into a vapor phase stream and a liquid phase stream. In further embodiments, the hydrogen production system can be characterized in relation to one or more of the following statements, which statements can be combined in any number and order.

The hydrogen production system further can comprise one or more heat exchangers configured for heating the hydrocarbon feed stream against one or both of the product gas stream comprising $H_2+CO$ and the stream comprising $H_2+CO_2$.

The hydrogen production system further can comprise one or more heat exchangers configured for transfer of excess heat to an external process.

The hydrogen production system further can comprise one or more lines configured for output of one or both of a waste fuel gas stream and steam generated in the hydrogen production system.

The hydrogen production system further can comprise one or more lines configured for delivery of at least part of the product stream formed of substantially pure hydrogen as fuel to a gas turbine.

The reactor unit can comprise a steam plus hydrocarbon plus optionally $CO_2$ catalytic reformer.

The reactor unit can comprise a partial oxidation unit.

The reactor unit can comprise a catalytic auto-thermal reformer.

The reactor unit can comprise a first stage unit that is either an auto-thermal reformer or a partial oxidation reactor and comprises a second stage gas heated steam plus hydrocarbon catalytic reformer.

At least part of the $H_2+CO$ stream produced from the reactor unit can be generated in an ITM partial oxidation reactor using a low pressure preheated feed air stream air stream.

The hydrogen production system of further can comprise a super-heater heat exchanger configured to transfer heat from an external heat source to at least the hydrocarbon feed stream.

The reactor unit can be a combined pressure vessel comprised of a partial oxidation zone and a gas heated reformer.

The partial oxidation zone can be at a bottom portion of the combined pressure vessel, and the gas heated reformer can comprise open-ended tubes in a middle zone of the combined pressure vessel and a waste heat boiler heat exchanger at a top portion of the combined pressure vessel.

In example embodiments, the present disclosure can provide a process for hydrogen production. In particular, the process can comprise: reacting a hydrocarbon feed stream and oxygen into a reactor unit to form a product gas stream comprising $H_2+CO$; passing the product gas stream comprising $H_2+CO$ through a steam generating boiler to add steam to the product gas stream comprising $H_2+CO$; converting the product gas stream comprising $H_2+CO$ in at least one reactor to form a stream comprising $H_2+CO_2$; processing the stream comprising $H_2+CO_2$ in a pressure swing adsorber to provide a product stream formed of substantially pure hydrogen and also provide waste gas steam comprising $CO_2$; forming a liquid $CO_2$ product stream in a cryogenic separation unit operating with auto-refrigeration by passing the waste gas stream comprising $CO_2$ therethrough such that at least 50 mol % of the $CO_2$ in the waste gas stream comprising $CO_2$ is separated into the liquid $CO_2$ product stream; and recycling a vapor phase stream from the cryogenic separation unit. In further embodiments, the process can be characterized in relation to one or more of the following statements, which can be combined in any number and order.

The cryogenic separation unit operating with auto-refrigeration can operate without using an external refrigerant.

The cryogenic separation unit can comprise: a drier configured for removing moisture from the waste gas stream comprising $CO_2$; at least one heat exchanger configured for cooling the waste gas stream comprising $CO_2$ against one or more cooling streams and providing the waste gas stream comprising $CO_2$ as a two-phase stream; and at least one expander configured for cooling the two-phase stream via expansion of the two-phase stream.

The cryogenic separation unit further can comprise: a compressor configured for compressing the waste gas stream comprising $CO_2$, the compressor being positioned upstream from the drier; and a separator configured for separating the two-phase stream into the vapor phase stream and the liquid $CO_2$ product stream.

The process can comprise removing $CO_2$ from the stream comprising $H_2+CO_2$ prior to processing the stream comprising $H_2+CO_2$ in the pressure swing adsorber.

The removing of $CO_2$ from the stream comprising $H_2+CO_2$ can comprise passing the removing $CO_2$ from the stream comprising $H_2+CO_2$ through a chemical or physical solvent based $CO_2$ removal unit.

A portion of the waste gas steam comprising $CO_2$ exiting the pressure swing adsorber can be compressed and recycled back to the reactor unit.

At least a portion of the vapor phase stream from the cryogenic separation unit can be recycled back to the reactor unit.

The vapor phase stream from the cryogenic separation unit can be processed through a second pressure swing absorber to remove at least a portion of any $H_2$ present in the vapor phase stream prior to recycling of the vapor phase stream from the cryogenic separation unit.

The process can comprise removing at least a portion of any argon and nitrogen present in one or both of the product gas stream comprising $H_2+CO$ and the stream comprising $H_2+CO_2$ prior to entry of the stream comprising $H_2+CO_2$ into the pressure swing absorber such that the total concentration of argon and nitrogen in the stream comprising $H_2+CO_2$ at an inlet of the pressure swing adsorber in the range of about 3 mol % to about 12 mol %.

At least 80 mol % of the $CO_2$ in the waste gas stream comprising $CO_2$ can be separated into the liquid $CO_2$ product stream.

The forming of the liquid $CO_2$ product stream in the cryogenic separation unit can comprise: providing the waste gas stream comprising $CO_2$ at a pressure such that a partial pressure of the $CO_2$ in the process stream is at least 15 bar; drying the waste gas stream comprising $CO_2$ sufficiently so that a dew point of the waste gas stream comprising $CO_2$ is reduced to a temperature of about −20° C. or less; cooling the waste gas stream comprising $CO_2$ in at least one heat exchanger to provide the waste gas stream comprising $CO_2$ as a two phase stream; expanding the two phase stream so as to reduce the temperature of the two phase stream to a temperature that is within about 15° C. of a freezing point of the two phase stream; and separating the two phase stream to provide the vapor phase stream and to provide the liquid $CO_2$ product stream.

The vapor phase stream from the cryogenic separation unit can be passed through a catalytic CO shift unit with an economizer heat exchanger, has steam added thereto, and is then passed through a catalytic reactor to convert at least a portion of the contained CO by reaction with the steam to form a further stream comprising $H_2+CO_2$ and to form a gas stream containing at least 60 mol % $H_2$.

BRIEF DESCRIPTION OF THE DRAWINGS

Figure 1:
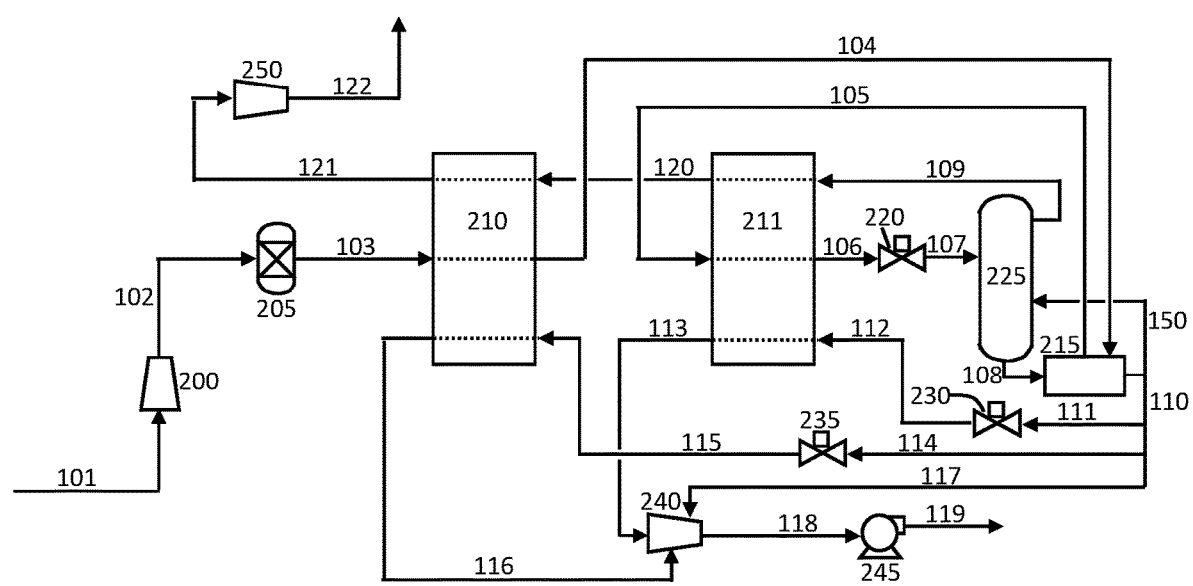

Having thus described the disclosure in the foregoing general terms, reference will now be made to the accompanying drawings, which are not necessarily drawn to scale, and wherein:

FIG. 1 is a flow diagram of a low temperature separation unit according to embodiments of the present disclosure useful for separation of carbon dioxide from a process stream utilizing auto-refrigeration.

Figure 2:
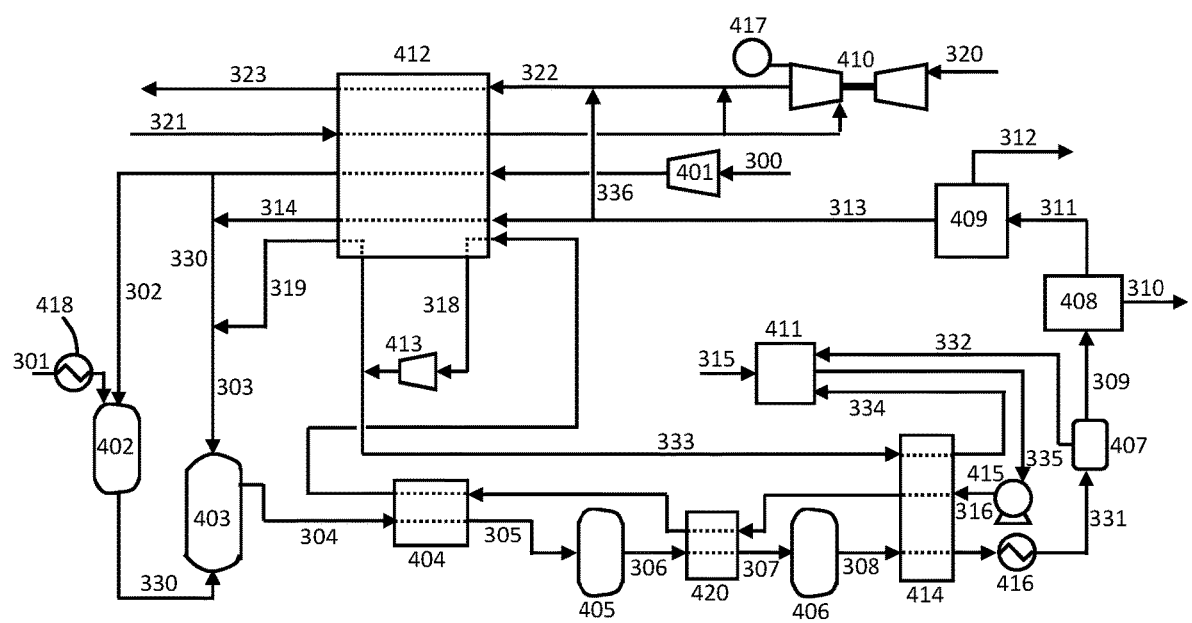

FIG. 2 is a flow diagram of a hydrogen production facility including a low temperature carbon dioxide separation unit according to embodiments of the present disclosure.

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides systems and methods for production of various materials that are typically gaseous at standard temperature and pressure (e.g., about 20° C. and about 1 bar). The systems and methods are particularly suitable for production of hydrogen and/or carbon dioxide. In one or more embodiments, the systems and methods can relate to the production of hydrogen alone or in combination with carbon dioxide. Likewise, the systems and methods can relate to the production of carbon dioxide that is separated from a process stream, and such separation can also relate to production of hydrogen. In some embodiments, the present systems and methods relate to processes useful in separating carbon dioxide from a process stream that may or may not include hydrogen. In specific embodiments, the systems and methods relate to the production of hydrogen and production of carbon dioxide and can include producing a stream comprising both of hydrogen and carbon dioxide and separating the carbon dioxide from the hydrogen to provide a substantially pure stream of hydrogen and a substantially pure stream of carbon dioxide.

In one or more embodiments, the present disclosure relates to systems and methods suitable for separation of carbon dioxide from a process stream. The process stream may be any industrial process stream comprising carbon dioxide. In some embodiments, the process stream may be a stream from a hydrogen production process. In other embodiments, the process stream may be any further industrial process stream comprising carbon dioxide wherein it can be beneficial to separate at least a portion of the carbon dioxide therefrom. For example, referring to FIG. 2, the process stream may be any of streams 308, 331, and 309. As such, the carbon dioxide separation process may be combined with a hydrogen production process as described herein, or the carbon dioxide separation process may be utilized with a different process stream.

A simplified block flow diagram of a carbon dioxide separation process according to the present disclosure is shown in FIG. 1. A seen therein, a process stream 101 containing $CO_2$ is provided. As noted above, the process stream 101 may be received from any source, such as a hydrogen production process. The process stream 101 can be compressed to a pressure of at least 30 bar, at least 35 bar, or at least 40 bar (e.g., to a maximum of 100 bar) within a compressor 200. In example embodiments, the compressor 200 may be an intercooled multi-stage compressor. The compression step preferably will raise the partial pressure of the $CO_2$ within the waste stream to at least about 15 bar (e.g., up to a maximum, in some embodiments, of about 55 bar). The $CO_2$ partial pressure can be raised to be in the range of about 15 bar to about 55 bar, about 15 bar to about 45 bar, or about 15 bar to about 40 bar. The compressed process stream 102 is then directed to a drier 205 to reduce the moisture content of the compressed process stream and form a first impure $CO_2$ stream 103. The extent of moisture removal can be adjusted as desired such that the dew point of the process stream will be reduced to a temperature as low as about −60° C. In various embodiments, the dew point can be reduced to a temperature of about −10° C. or less, about −20° C. or less, or about −40° C. or less, such as to a low temperature of about −60° C. For example, the dew point can be reduced to a temperature in the range of about −60° C. to about −10° C., about −60° C. to about −20° C., or about −60° C. to about −30° C. The drier 205, in some example embodiments, can be a drying bed packed with appropriate desiccant material, such as molecular sieves or zeolites.

The first impure $CO_2$ stream 103 is cooled to significantly reduce the temperature thereof and ultimately form a two phase stream that is then subject to rapid cooling utilizing auto-refrigeration. In some embodiments, auto-refrigeration can generally indicate that the refrigeration is carried out in the express absence of any external refrigerant. In other words, the streams are not cooled against a typical refrigerant stream, such as Freon, liquid nitrogen, liquid propane, ammonia, or the like. Rather, the stream is only cooled against further streams produced in the $CO_2$ separation process and using expansion techniques. In particular, auto-refrigeration can indicate that at least one stream comprising a liquid component is expanded to provide for rapid cooling of the stream.

Returning to FIG. 1, the first impure $CO_2$ stream 103 is directed to a first heat exchanger 210 to partially cool down and form the second impure $CO_2$ stream 104. Thereafter, the second impure $CO_2$ stream 104 is directed to a reboiler heat exchanger 215 to further cool down and form the third impure $CO_2$ stream 105. The third impure $CO_2$ stream 105 is further cooled down in a second heat exchanger 211 to form a fourth impure $CO_2$ stream 106. The foregoing cooling steps can be effective to provide the impure $CO_2$ stream(s) in the form of a two phase stream including a gaseous component and a liquid component. In some embodiments, the two phase stream is at least partially formed during passage through the reboiler heat exchanger 215 and/or is formed during passage through the second heat exchanger 211.

To further facilitate cooling of the impure $CO_2$ stream, the fourth impure $CO_2$ stream 106 is expanded within a first valve 220 to an appropriate pressure that would drop the temperature of the expanded impure $CO_2$ stream 107 to near the $CO_2$ triple point temperature (−56.4° C.). For example, expansion of the stream 106 can be effective to reduce the temperature of the stream to within about 15° C., within about 10° C., or within about 5° C. of the freezing point of the $CO_2$ in the stream. A cold, two phase $CO_2$ stream 107 thus exits the first valve 220.

The cold two phase $CO_2$ stream 107 becomes a feed stream to the mass transfer column 225. The mass transfer column 225 has a stripping section 226 below the feed point of stream 107 producing a high purity liquid $CO_2$ stream 108 as a bottom product and a rectifying section 227 above the feed point of stream 107 producing a purified top vapor phase product 109. The mass transfer column 225 is packed with appropriate packing material to enhance the mass transfer within the column and collection of the liquid $CO_2$ at high purity. The design of the stripping column will be done such that it can effectively handle the two-phase feed stream which could be done in variety of ways such as but not limited to flashing the feed in a flash vessel prior to the entrance to the stripping column, the use of a gallery tray or chimney tray within the column or any combination of thereof. The bottom liquid $CO_2$ product 108 typically contains about 80 mol % and preferably at least 85 mol % of the total $CO_2$ within the impure $CO_2$ stream 107 while the rest of the $CO_2$ content and other volatile impurities within the feed waste stream would end up in the overhead vapor phase stream 109. In various embodiments, the bottom liquid $CO_2$ product 108 can contain at least 50 mol %, at least 60 mol %, at least 70 mol %, or at least 80 mol % (e.g., about 50 mol % to about 99 mol %, about 60 mol % to about 98 mol %, about 70 mol % to about 95 mol %, or about 75 mol % to about 90 mol %) of the total $CO_2$ within the cold two phase $CO_2$ stream 107. The bottom liquid $CO_2$ product 108 passes through the reboiler heat exchanger for further cooling and exits as purified a $CO_2$ product stream that splits into a first portion 110 and a second portion 150, which is recycled back into the bottom section of the mass transfer column 225.

The cool overhead vapor phase stream 109 can be used as a source of refrigeration to cool down the impure $CO_2$ streams in heat exchangers 210 and 211. These two heat exchangers are preferably plate and fin type made from aluminum and although they are shown as discrete blocks in FIG. 1, they may be designed and fabricated as a single unit with two (or more) sub-unit or sections. The system is suitably insulated. The liquid $CO_2$ product 108 preferably is at least 80% molar pure $CO_2$, at least 85% molar pure $CO_2$, at least 90% molar pure $CO_2$, at least 95% molar pure $CO_2$, at least 98% molar pure $CO_2$, at least 99% molar pure $CO_2$, at least 99.5% molar pure $CO_2$, or at least 99% molar pure $CO_2$.

To generate additional refrigeration duty, the purified $CO_2$ product stream portion 110 exiting the reboiler heat exchanger 215 can be divided into 3 separate streams 111, 114, and 117. Purified $CO_2$ product streams 111 and 114 can be reduced in pressure by expansion in valves 230 and 235, respectively, to achieve appropriate temperature profiles in heat exchangers 210 and 211. Specifically, purified $CO_2$ product stream 111 exits valve 230 as stream 112 and passes through heat exchanger 211 to provide purified $CO_2$ stream 113. Similarly, purified $CO_2$ product stream 114 exits valve 235 as stream 115 and passes through heat exchanger 210 to provide purified $CO_2$ stream 116. Although each of streams 112 and 115 are illustrated as passing through only one of heat exchangers 210 and 211, it is understood that one or both of streams 112 and 115 may be passed through both of heat exchangers 210 and 211 prior to passing to the compression step described next. The purified $CO_2$ streams (113, 116 and 117) will be partially pressurized and mixed within a compressor 240 to form a high density $CO_2$ stream 118 before being raised in pressure to the required end-use pressure in a liquid pump 245 to leave as final $CO_2$ product stream 119. The final warm overhead vapor phase stream 109 can be optionally compressed based on the downstream application requirement.

An important feature of this arrangement is the capability of recycling the vapor phase stream 109 from the separation column 225 after warming in heat exchanger 211 to form stream 120 and heating in heat exchanger 210 to form stream 121 at near ambient temperature. The stream 121 can be compressed in compressor 250 to form stream 122. The stream 122 can be at least partially combined with original feed stream 101, and this recycle allows for a favorable increase in the overall $CO_2$ recovery from the process feed stream 101. Furthermore, the stream 122 can be partially or completely recycled back as the feedstock to a chemical production process (such as a hydrogen production process further described below) and achieve up to 100% $CO_2$ capture from the chemical production process.

In example embodiments, the presently disclosed systems and methods for carbon dioxide separation particularly can be useful with hydrogen generation processes or revamping of existing hydrogen generation processes that utilize only one $H_2$ separation train such as PSA beds or membrane separators to achieve 100% $CO_2$ capture. Current methods of thermochemical hydrogen generation typically rely on recovery of hydrogen using PSA beds. Specifically, natural gas and steam (and optionally oxygen) can be input to an $H_2$+CO syngas generation area along with a PSA waste gas. The product therefrom is subjected to syngas cooling and shifting of the CO to $H_2$. Thereafter, PSA separation is carried out to provide an $H_2$ product and the PSA waste gas. The PSAs recover 75% to 90% of the total hydrogen in the feed gas. The PSA waste gas containing typically 10% to 15% of the hydrogen production together with all the $CO_2$ produced from $H_2$ generation is generally burned with $CO_2$ vented to the atmosphere.

The systems and methods of the present disclosure can be utilized to capture substantially 100% of the $CO_2$ from hydrogen generating processes by recovering $CO_2$ from a pressure swing absorber (PSA) waste stream. This can encompass, for example, utilizing a $CO_2$ separation process as described above in combination with a hydrogen production process as will be described below. Separation of $CO_2$ from PSA off-gas increases the hydrogen concentration in $CO_2$ separation train waste gas to at least about 60 mol % which would make it suitable and economic for additional $H_2$ recovery within a second PSA. In addition, based on the concentration of CO within $CO_2$ separation train waste gas, it can be optionally shifted, prior to the second $H_2$ recovery step, using a small low temperature shift reactor to further increase its hydrogen content. The off-gas from the second PSA unit will be recycled back to the syngas generation reactors. It can also be optionally mixed with the off-gas from the first PSA to increase $CO_2$ recovery in the $CO_2$ cryogenic separation system.

Previous efforts have been undertaken to provide for production of hydrogen through combination with additional systems, and one or more elements from such previous endeavors may be integrated into the presently disclosed systems and methods. For example, U.S. Pat. No. 6,534,551, the disclosure of which is incorporated herein by reference, describes the combination of: 1) a hydrocarbon fuel gas reaction with steam and or oxygen; and 2) a power system utilizing a compressed oxidant gas in which a fuel gas is burned with combustor products producing power by work expansion and in which the expanded combustion product gas is used to superheat the steam used in hydrogen synthesis reactions and in which the oxygen production unit is driven by at least a portion of the power produced by the expansion of the combustion product gas.

In one or more embodiments, the present systems and methods can beneficially provide for hydrogen production with capture of substantially all of the carbon produced, particularly substantially all of the $CO_2$ produced. In this manner, the present disclosure may refer to a hydrogen plant, and it is understood that such hydrogen plant refers to the combination of elements necessary to form the hydrogen production system utilized herein. A hydrogen plant as described herein thus can be configured for producing substantially pure hydrogen and likewise producing substantially pure carbon dioxide that is separated from a crude hydrogen stream.

A hydrogen production plant for use according to the present disclosure can incorporate any variety of elements known to be suitable in prior hydrogen production plants. In particular, the hydrogen production plant can comprise a reactor unit configured for forming a stream comprising CO+$H_2$ gas. The reactor unit can encompass a single element or a plurality of elements. For example, a reactor unit in a hydrogen production plant can comprise a two stage reactor unit including a first stage reactor which converts a hydrocarbon feed to a CO+$H_2$ gas. Such so-called $H_2$+CO synthesis gas generation reactor can be any one or more of a steam methane reforming (SMR) reactor, a partial oxidation (PDX) reactor, an autothermal reforming (ATR) reactor, a PDX+GHR (gas heated reactor), or an ATR+GHR. In some embodiments, partial oxidation of a natural gas feed with pure oxygen can be carried out at an outlet temperature of about 1300° C. to about 1500° C. at typical pressures of about 30 bar to about 150 bar. An auto-thermal reformer can add steam and excess hydrocarbon, generally natural gas, after the partial oxidation burner so that the high temperature gases can then pass through a bed of catalyst where subsequent steam-hydrocarbon reforming reactions take place yielding further $H_2$+CO and cooling the gas mixture to an outlet temperature of about 1000° C. to about 1100° C. at pressures of about 30 bar to about 150 bar. The second stage reactor can comprise a steam/hydrocarbon catalytic reformer in which the total $H_2$+CO gas product from both reactors (e.g., at a temperature of about 1000° C. or greater) is used to provide the endothermic heat of the reforming reactions in a convectively heated shell side flow with catalyst in the tubes. Optionally the two reactors can operate in a series or parallel mode. A favorable configuration uses a vertical gas heated reformer (GHR) with catalyst filled open ended tubes hanging from a single tube sheet at the top of the vessel, with the product $H_2$+CO leaving the reformer tubes and mixing with the product gas from a PDX reactor or an ATR in the base of the GHR, and the total product $H_2$+CO stream passing through the shell side and cooling typically from about 1050° C. to 550° C. to 800° C.

An advantage of the two reactor configuration is that the yield of $H_2$+CO from hydrocarbon feed is maximized, and all $CO_2$ formed in the reactions is contained within the high-pressure system. The product CO+$H_2$ gas is further cooled in a steam generating waste heat boiler (WHB), and a further advantage is that this steam quantity is only sufficient to provide the required steam flow to the two $H_2$+CO reactors with only a small excess flow. The system has no large by-product steam production.

To generate hydrogen, the $H_2$+CO product leaving the WHB at a typical temperature of about 240° C. to about 290° C. and containing typically about 20 mol % to about 40 mol % steam is passed through either one or two (or more) catalytic shift converters where CO reacts with steam to produce $CO_2$ and more $H_2$. The reactions for the whole $H_2$ production process sequence are shown below (using $CH_4$ as the hydrocarbon).

| | | | |
|---|---|---|---|
| $CH_4$ + ½$O_2$ | → | CO + 2$H_2$ | Partial oxidation |
| $CH_4$ + 2$O_2$ | → | $CO_2$ + 2$H_2O$ | Combustion |
| $CH_4$ + $H_2O$ | → | CO + 3$H_2$ | Steam reforming |
| $CH_4$ + $CO_2$ | → | 2CO + 2$H_2$ | Dry reforming |
| CO + $H_2O$ | → | $CO_2$ + $H_2$ | CO shift |

The total CO+$H_2$ product passing through the CO shift reactors is cooled, and a significant amount of heat is released generally at a temperature level of up to 400° C. or lower as the gas cools and steam condenses. This heat is released not at a single temperature level but over a temperature range down to near ambient temperature. Part of this heat release can be used to preheat boiler feed water, to produce the steam required for syngas production in the reactors but there is a large excess quantity that is at a low temperature level and only available over a temperature range.

The efficiency of the $H_2$+CO generation in the two reactors can be significantly increased by preheating the hydrocarbon and steam feeds to typically about 400° C. to about 600° C. and preferably to about 500° C. to about 550° C. This preferably is done using an external heat source since no excess heat at these temperature levels is available within the $H_2$+CO generation reactors plus WHB.

In one or more embodiments, systems and methods of producing the $H_2$+CO syngas which can be used to produce the pure hydrogen product stream according to the present disclosure may exhibit desired characteristics that can be beneficial for integration of the hydrogen production with other systems, such as power generation systems. The excess heat available over a temperature range from near ambient up to about 400° C. is ideal for boiler feed water heating in a steam based power cycle or for heating a high pressure $CO_2$ stream. In each case the result is a reduction in parasitic power demand and an increase in power cycle efficiency. The required external heat need to preheat the syngas reactor feed streams up to about 550° C. can easily be provided using high temperature boiler flue gas leaving the super-heater in a pulverized coal fired power boiler or using the hot turbine exhaust from an industrial gas turbine in a combined cycle power generation system or using a further high temperature exhaust stream from a power production system. The heat integration leads to an overall increase in the efficiency of a combined system.

The cooled $H_2$ rich gas stream is now passed through an ambient cooler where condensed water is removed. The gas stream is then passed through a conventional multi-bed pressure swing adsorber (PSA) which separates typically about 85% to about 90% of the hydrogen as a pure stream having typically about 10 ppm to about 50 ppm total impurities. All the impurities in the crude $H_2$ feed stream are separated as a waste fuel gas stream, which waste stream can comprise any combination of components, such as $H_2$, CO, $CO_2$, $CH_4$, $N_2$, Ar, and a small quantity of vapor phase $H_2O$. The pressure is typically about 1.1 bar to about 1.6 bar. This waste gas typically has about 20% of the total hydrocarbon reactor hydrocarbon feed lower heating value (LHV) so its efficient use is critical to the overall economics of $H_2$ production. The waste gas contains all the carbon from the total hydrocarbon feed as $CO_2$+CO and the recovery of this carbon as pure $CO_2$ at pipeline high pressure is vital to meet climate change emission objectives. In order to recover the carbon present in the hydrocarbon feed to the hydrogen plant as $CO_2$ product the ideal objective is to convert residual CO by catalytic shift reaction with added steam to produce $CO_2$+$H_2$ then separate the $CO_2$ as a pure product stream. Three options are available which address this problem of $CO_2$ removal and the maximization of $CO_2$ recovery.

In some embodiments, $CO_2$ removal and the maximization of $CO_2$ recovery can comprise adding a chemical or physical solvent scrubbing unit to remove all the $CO_2$ from the ambient temperature PSA feed stream. For example, this can be achieved by treating the ambient temperature crude $H_2$ stream in an amine $CO_2$ scrubbing system upstream of the PSA. The waste gas from the PSA can then be used as a minor portion of the fuel stream consumed in the power system. The PSA waste gas stream contains a significant quantity of $H_2$+CO. Alternatively, the waste gas stream can be compressed to a pressure of 1 to 2 bar higher than the $H_2$ delivery pressure from the PSA and then passing this gas stream with added steam through a catalytic CO shift conversion unit which would convert over 90% of the CO by reaction with steam to $CO_2$+$H_2$. The cooled product gas stream will now have a hydrogen concentration of 60% to 70% (molar). This gas stream can then be passed through a second multi-bed pressure swing adsorption unit to recover an additional $H_2$ product stream at the same pressure and purity as the hydrogen from the first PSA. The waste gas from the second PSA unit which contains all the inert argon and nitrogen derived from the hydrocarbon and oxygen reactor feed streams can beneficially be sent to the power plant for combustion. The disadvantage of the amine $CO_2$ removal system is its high capital cost and the large quantity of low pressure steam required for amine regeneration to produce the pure $CO_2$ product stream. This combination of amine scrubbing plus first stage PSA plus CO shift plus second stage PSA results in an overall ratio of $H_2$ product divided by ($H_2$+CO) present in the syngas reactor product stream of greater than 95% and preferably greater than 97%.

In other embodiments, $CO_2$ removal and the maximization of $CO_2$ recovery can comprise eliminating the MEA unit or the physical solvent $CO_2$ removal unit upstream of the first PSA leaving all the $CO_2$ in the PSA waste gas stream. The stream then can be treated utilizing cryogenic cooling for separation of the $CO_2$ as otherwise described herein.

In further embodiments, $CO_2$ removal and the maximization of $CO_2$ recovery can comprise recycling one or more streams back to the feed streams for the PDX or ATR or GHR or SMR reactors. By closing the recycle loop completely, inert components can be vented from the system. The vented purge gas stream can be taken at ambient temperature upstream of the first PSA and sent, for example, to a power plant for combustion. The level of argon present in the oxygen stream and nitrogen present in both the hydrocarbon feed and the oxygen streams are preferably kept at a low total concentration of from about 3 mol % to about 12 mol % in the feed gas to the first PSA. This arrangement does not require a second CO shift and PSA system. All the hydrogen will be produced from the main PSA while all the $CO_2$ will be produced from the low temperature $CO_2$ removal system. As further described herein, $CO_2$ separation can be applied independent of the hydrogen production processes described herein. Suitable $CO_2$ separations systems and methods are thus described herein that may be applied to any process stream comprising $CO_2$.

Example embodiments of a hydrogen production plant (and an associated hydrogen production process) are evident in relation to FIG. 2. The hydrogen plant can be fueled with a hydrocarbon fuel source, preferably a gaseous hydrocarbon, and more preferably with substantially pure methane. The example embodiment of FIG. 2 is described in relation to the use of methane as the hydrocarbon. In FIG. 2, the methane in stream 300 is compressed in compressor 401 to a pressure of about 20 bar to about 120 bar, about 40 bar to about 110 bar, or about 60 bar to about 100 bar. The compressed methane stream is passed through a heat exchanger 412 to heat the methane stream to a temperature of about 300° C. to about 700° C., about 350° C. to about 650° C., or about 400° C. to about 600° C. The methane exiting the heat exchanger 412 is split into two streams 302 and 303. The methane is thus directed to a reactor unit that, as exemplified in FIG. 2, is formed of a PDX reactor 402 and a GHR 403. In other embodiments, it is understood that the reactor unit may be formed of a single device or multiple devices as otherwise already discussed herein. The methane in stream 302 combined in the PDX reactor with an oxygen stream 301 that is pre-heated in heater 418 prior to passage into the PDX reactor. Preferably, the oxygen stream 301 can be about 99.5% pure $O_2$ and can be taken, for example, from a cryogenic air separation plant (not illustrated). The oxygen entering the PDX reactor 302 may be at a pressure in the range of about 20 bar to about 120 bar, about 40 bar to about 110 bar, or about 60 bar to about 100 bar.

The methane is partially oxidized in the PDX reactor 302 with the oxygen to produce a product $H_2$+CO stream 330 at a temperature of about 700° C. to about 1800° C., about 900° C. to about 1700° C., or about 1100° C. to about 1600° C. The product $H_2$+CO stream 330 optionally be quenched and cooled by the addition of a quenching stream, such as to a temperature that is about 50° C. or more, about 75° C. or more, or about 100° C. or more below the temperature of the product $H_2$+CO stream 330 directly exiting the PDX reactor 402. The optionally quenched product $H_2$+CO stream 330 enters the base of the GHR reactor 403, undergoes endothermic reforming reactions, and leaves the GHR as stream 304. The total product CO+$H_2$ stream can exit the GHR 304 at a temperature of about 300° C. to about 900° C., about 400° C. to about 800° C., or about 500° C. to about 700° C. The total product CO+$H_2$ stream 304 passes through the waste heat boiler 404 and exits in stream 305 at a temperature in a range of about 150° C. to about 450° C., about 200° C. to about 425° C., or about 250° C. to about 400° C. The waste heat boiler can be a steam generating boiler and thus can be effective to add steam to the total product CO+$H_2$ stream.

The product stream comprising $H_2$+CO is then reacted in at least one reactor to form a stream comprising $H_2$+$CO_2$. As illustrated in FIG. 2, the total product CO+$H_2$ stream 305 passes through a first catalyst filled CO shift reactor 405 and a second catalyst filled CO shift reactor 406 in series with respective outlet streams 306 and 308. The outlet stream 308 passes through heat recovery heat exchanger 420, and the outlet stream 308 passes through heat recovery heat exchanger 414 and, in each of the heat exchangers, heat is used to heat boiler feed-water preheating streams to provide boiler feed-water for waste heat boiler 404.

The stream 308 comprises $H_2$+$CO_2$, but it is understood that any stream described herein as comprising $H_2$+$CO_2$ only defines the minimal composition of the stream, and further materials may be present in said stream, such as carbon monoxide and one or more carbon-containing materials. After stream 308 passes through the heat exchanger 414, the stream 308 is cooled in water cooler 416 to near ambient temperature and exits as cooled, crude $H_2$+$CO_2$ stream 331. The crude $H_2$+$CO_2$ stream 331 preferably can contain substantially all of the $CO_2$ derived from combustion of carbon in the hydrocarbon feed together with water vapor and minor amounts of CO, $CH_4$, $N_2$ and Ar. Condensed water is separated from cooled, crude $H_2$+$CO_2$ stream 331 in separator 407. Water stream 332 from the separator 407 and cooled boiler feed-water stream 334 enter a water treatment unit 411 which produces purified water 55 and an excess water stream 61. The purified water stream 335 (which is recycled for use as the boiler feed-water) is pumped to about 87 bar pressure in pump 415, and boiler feed water stream 316 enters the heat exchanger 414 before passing through heat exchanger 420 to the waste heat boiler 404. The boiler feed-water exiting pump 13 can be at a pressure in the range of about 50 bar to about 120 bar, about 60 bar to about 110 bar, or about 70 bar to about 100 bar.

The saturated steam stream 317 leaving the waste heat boiler 404 first passes through heat exchanger 412 to exit as stream 318, which is compressed in compressor 413. Stream 329 exiting the compressor 413 branches, and steam stream 319 passes through the heat exchanger 412 before combining with methane stream 303 for entry into the GHR 403. Steam in stream 333 passes back through heat exchanger 414 to exit as stream 334 for passage into the water tank/water treatment unit 411.

The steam stream 319 fed to the GHR reactor 403 provides a steam to carbon ratio (carbon combined with hydrogen in the GHR reactor feed) of 6:1 in this case. This high ratio allows 80 bar $H_2$+CO production pressure with a low quantity of unconverted methane in the total product $H_2$+CO stream 304. In some embodiments, the steam to carbon ratio can be about 2:1 to about 10:1, about 3:1 to about 9:1, or about 4:1 to about 8:1. Preferably, the steam to carbon ratio is at least 3:1, at least 4:1, or at least 5:1.

The purified $H_2$+$CO_2$ product in stream 309 exits the separator 401 and is next processed in a pressure swing adsorber 408 to provide a product stream formed of substantially pure hydrogen in stream 310 and also provide waste gas comprising $CO_2$ in stream 311. For example, the substantially pure $H_2$ product stream 310 can be at a pressure of about 50 bar to about 120 bar, about 60 bar to about 110 bar, or about 65 bar to about 100 bar and can have an impurity level of about 10 ppm to about 200 ppm impurity, about 20 ppm to about 175 ppm impurity, or about 25 ppm to about 150 ppm impurity. In some embodiments, the substantially pure $H_2$ product stream 310 can comprise about 60% to about 98%, about 70% to about 95%, or about 75% to about 92% of the hydrogen from stream 309.

The waste gas in stream 311 preferably contains all the $CO_2$ plus CO, $H_2$, $CH_4$, Argon, $N_2$ and traces of water vapor previously in stream 309. The waste gas stream 311 is then processed in a low temperature separation unit 409 (e.g., a cryogenic separation unit) as otherwise described herein to form a liquid $CO_2$ product stream. As discussed above, this is preferably carried out such that at least 50 mol % of the $CO_2$ in the waste gas stream 311 is separated into the liquid $CO_2$ product stream. Separated $CO_2$ is removed in $CO_2$ stream 312. The remaining vapor phase materials exit the low temperature separation unit 409 in vapor phase stream 313.

The vapor phase stream 313 from the low temperature separation unit 409 can be recycled for a variety of uses. In FIG. 2, the vapor phase stream 313 branches, and a first portion of the vapor phase passes in vapor phase portion one stream 314 through the heat exchanger 412 to combine with the hydrocarbon feed stream 303. In this manner, the remaining impurities are recycled back through the system, particularly being fed back into the GHR reactor 403.

In one or more embodiments, the hydrogen production system can include a combined heat source that is separate from the $H_2$+CO synthesis gas generation reactor but that is configured to provide heat that can be provided to one or more streams of the hydrogen production system to increase efficiency thereof. Power production systems can be particularly beneficial for providing a combined heat source. In particular, one or more exhaust streams formed in a power production system can be a combined heat source in that heat can be taken therefrom for transfer to one or more streams in the hydrogen production system.

A particularly beneficial integration of power production and hydrogen production is the gas turbine combined cycle power system. These units are used worldwide usually with natural gas as the fuel. The industrial gas turbine exhaust which is generally at a temperature in the range 550° C. to 650° C. is passed through a large finned tube economizer heat exchanger where it is used to generate high pressure intermediate pressure and low pressure steam for additional power generation using steam turbines. The turbine exhaust at high temperature is suited for use as a combined heat source for addition of heat to the hydrogen production system. Said combined heat source can be used, for example, for preheating the feed streams to the $H_2$ plant syngas reactors. Such heating can be in the range of about 400° C. to about 1000° C., about 425° C. to about 800° C., about 450° C. to about 600° C., or about 500° C. to about 550° C. Additionally, the excess heat available from the $H_2$ plant is ideal for boiler feed-water preheating over a temperature range up to 400° C., which releases extra steam for power production in the steam turbines. The main benefit lies in the use of the hydrogen as a fuel in the gas turbine.

In systems and methods as described herein, the use of substantially pure oxygen in the hydrogen plant syngas reactors can have the side benefit of providing a large quantity of substantially pure nitrogen as a by-product from the cryogenic air separation plant. The nitrogen can be provided at relatively high pressure directly from the air separation unit as stream 93. At least a portion of this nitrogen can be blended with the hydrogen that can be produced as described herein. The end result is an $H_2$+$N_2$ fuel gas that is suitable for use in a conventional gas turbine combined cycle power generation system. The blended inert nitrogen is generally required to reduce the adiabatic flame temperature in the gas turbine combustor and has the added benefit of increasing the mass flow of gas in the power turbine. It can also be beneficial to preheat the $H_2$+$N_2$ fuel gas and add steam generated from the heat present in the excess boiler feed water stream 59 at a temperature level below 400° C.

The $H_2$+$N_2$ fuel gas can be utilized in any gas turbine combined cycle power generation system. Known systems can be modified as necessary to remove, decommission, or otherwise forego the use of elements that would otherwise be required for removal of $CO_2$. Known gas turbine combined cycle power generation systems that can be utilized according to the present disclosure are described in U.S. Pat. Nos. 8,726,628, 8,671,688, 8,375,723, 7,950,239, 7,908,842, 7,611,676, 7,574,855, 7,089,727, 6,966,171, and 6,474,069, the disclosures of which are incorporated herein by reference.

The combination of $H_2$ production with 100% potential $CO_2$ capture with a gas turbine combined cycle power generation system using at least a portion of the produced $H_2$ as fuel provided by the present disclosure results in substantially no atmospheric discharge of $CO_2$ from the combined system. This provides a distinct advantage over the conventional operation of a gas turbine combined cycle system. In particular, the present combination of systems can eliminate the natural gas fuel typically required in a gas turbine and substitute a fuel with no $CO_2$ production when combusted. As such, in some embodiments, the present disclosure provides a combination of: 1) an oxygen based hydrogen production unit with near 100% $CO_2$ capture; 2) a conventional gas turbine combined cycle power generation unit using $H_2$+$N_2$ fuel gas that provides power generation with zero $CO_2$ emission. The combined system as described herein can provide a surprisingly high efficiency, low cost power generation, and approximately 100% $CO_2$ capture.

The combination of systems can be implemented in a variety of manners. In some embodiments, an existing combined cycle power station can be converted to eliminate all $CO_2$ emissions and simultaneously increase the power generation capacity. Such conversion can include addition of the further system components described herein for production of power using a $CO_2$ circulating fluid and production of $H_2$+$N_2$ fuel gas.

As illustrated in FIG. 2, a gas turbine 410 is provided, and hydrocarbon fuel stream 321 is input thereto for combustion to produce power in generator 417. The gas turbine exhaust stream 322 is passed through the heat exchanger 412 to provide heating to hydrocarbon fuel stream 321, stream 401, stream 317, and stream 319. The temperature of the exhaust stream 322 from the gas turbine 410 can be optionally raised by means of duct-burning using, for example, fresh preheated natural gas taken from stream 321 and input to stream 322, or using a waste fuel stream, such as a vapor phase portion two stream 336 taken from stream 313 exiting the low temperature $CO_2$ separation unit and input to stream 322. This is beneficial to accommodate for required heating duty in the process heater 412, and the duct-burning thus can take place in the piping for stream 322. In some embodiments, streams 336 and 314 may be separate streams exiting the low temperature $CO_2$ separation unit instead of being branches of a single exit stream, as illustrated.

In some embodiments, a hydrogen production facility as described herein can be particularly suited to provide excess low temperature level heat that can be used in a variety of further systems for a variety of further reasons.

The waste gas from the PSA of the hydrogen production system can be compressed to typically about 200 bar to about 400 bar and mixed with the feed hydrocarbon fuel used in a combustor of a power production system. The waste gas contains not only flammable components $CH_4$+$CO$+$H_2$ but also all the $CO_2$ produced in the $H_2$ production system. Alternatively the waste gas from the PSA can be compressed to the inlet pressure of the first PSA, the $CO_2$ can be removed in one of a number of processes described above, and the $CO_2$ depleted gas stream can be sent to a second PSA to separate more $H_2$ to add to the total $H_2$ product stream. Optionally the waste gas can be preheated in an economizer heat exchanger, steam can be added and more $H_2$ can be produced in an additional catalytic CO shift reactor, the gas can then be cooled in the economizer heat exchanger before being processed to separate more $H_2$ in the second PSA. The hydrogen production system is thus suited for production of a significant quantity of low grade heat from the cooling $H_2$+$CO$ stream at a temperature level of typically below 400° C. and preferably in the range 240° C. to about 290° C.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A hydrogen production system comprising:
one or more units configured to receive a hydrocarbon feed stream and effective to provide a product gas stream comprising $H_2$+$CO$;
at least one reactor configured for receiving the product gas stream comprising $H_2$+$CO$ and providing a stream comprising $H_2$+$CO_2$;
one or more heat exchangers configured for:
heating the hydrocarbon feed stream against one or both of the product gas stream comprising $H_2$+$CO$ and the stream comprising $H_2$+$CO_2$, and
heating a hydrocarbon fuel stream against a gas turbine exhaust stream and outputting the heated hydrocarbon fuel stream to a gas turbine to produce power;
a pressure swing adsorber configured to receive the stream comprising $H_2$+$CO_2$ and provide a product stream formed of substantially pure hydrogen and also provide a waste gas steam comprising $CO_2$;
a low temperature separation unit configured to separate the waste gas stream comprising $CO_2$ into a vapor phase stream depleted in $CO_2$ and a liquid product stream concentrated in $CO_2$, wherein at least 50 mol % of the $CO_2$ in the waste gas stream comprising $CO_2$ is separated into the liquid $CO_2$ product stream;
a first line arranged to pass a first portion of the vapor phase stream depleted in $CO_2$ through the one or more heat exchangers to combine with the hydrocarbon feed stream; and
a second line arranged to pass a second portion of the vapor phase stream depleted in $CO_2$ to the gas turbine exhaust stream for heating the hydrocarbon fuel stream in the one or more heat exchangers.

2. The hydrogen production system of claim 1, further comprising one or more heat exchangers configured for transfer of excess heat from the product gas stream comprising $H_2$+$CO$ to an external process.

3. The hydrogen production system of claim 1, further comprising one or more lines configured for output of one or both of a waste fuel gas stream and steam generated in the hydrogen production system.

4. The hydrogen production system of claim 1, further comprising one or more lines configured for delivery of at least part of the product stream formed of substantially pure hydrogen as fuel to a gas turbine.

5. The hydrogen production system of claim 1, wherein the one or more units configured to receive a hydrocarbon feed stream and effective to provide a product gas stream comprising $H_2$+$CO$ comprises a steam methane reformer arranged to receive a steam stream in addition to the hydrocarbon feed stream.

6. The hydrogen production system of claim 1, wherein the one or more units configured to receive a hydrocarbon feed stream and effective to provide a product gas stream comprising $H_2$+$CO$ comprises a partial oxidation (PDX) reactor arranged to receive a stream of oxygen in addition to the hydrocarbon feed stream.

7. The hydrogen production system of claim 1, wherein the one or more units configured to receive a hydrocarbon feed stream and effective to provide a product gas stream comprising $H_2$+$CO$ comprises a catalytic auto-thermal reactor (ATR) arranged to receive a steam stream and a stream of oxygen in addition to the hydrocarbon feed stream.

8. The hydrogen production system of claim 1, wherein the one or more units configured to receive a hydrocarbon feed stream and effective to provide a product gas stream comprising $H_2$+$CO$ comprises one of a partial oxidation (PDX) reactor arranged to receive a stream of oxygen in addition to the hydrocarbon feed stream and a catalytic auto-thermal reactor (ATR) arranged to receive a steam stream and a stream of oxygen in addition to the hydrocarbon feed stream and also comprises a gas heated reformer (GHR) arranged to receive at least a portion of the stream comprising $H_2$+$CO$ from the PDX reactor or the ATR in addition to the hydrocarbon feed stream.

9. The hydrogen production system of claim 1, further comprising a steam generating boiler configured for cooling the product gas stream comprising $H_2$+$CO$ and for forming steam.

10. The hydrogen production system of claim 1, wherein the one or more units configured to receive a hydrocarbon feed stream and effective to provide a product gas stream comprising $H_2$+$CO$ comprise an ion transport membrane (ITM) partial oxidation reactor arranged to receive a low pressure preheated feed air stream in addition to the hydrocarbon stream.

11. The hydrogen production system of claim 1, further comprising a super-heater heat exchanger configured to transfer heat from an external heat source to at least the hydrocarbon feed stream.

12. The hydrogen production system of claim 1, wherein the one or more units configured to receive a hydrocarbon feed stream and effective to provide a product gas stream comprising $H_2$+$CO$ is a combined pressure vessel that includes at least a partial oxidation zone and a catalytic steam plus hydrocarbon zone.

13. The hydrogen production system of claim 12, wherein the partial oxidation zone is at a bottom portion of the combined pressure vessel, the catalytic steam plus hydrocarbon zone comprises open-ended tubes in a middle zone of the combined pressure vessel, and the combined pressure vessel further includes a waste heat boiler heat exchanger at a top portion thereof.

14. The hydrogen production system of claim 1, wherein the low temperature separation unit is a cryogenic separation unit.

15. The hydrogen production system of claim 1, wherein the low temperature separation unit is configured for compression of the waste gas stream comprising $CO_2$.

16. The hydrogen production system of claim 15, wherein the low temperature separation unit is further configured for drying the waste gas stream comprising $CO_2$ after the compression.

17. The hydrogen production system of claim 15, wherein the low temperature separation unit is further configured for cooling the waste gas stream comprising $CO_2$ by one or both of heat exchange and expansion.

18. The hydrogen production system of claim 15, wherein the low temperature separation unit is further configured for passage of the waste gas stream comprising $CO_2$ through a mass transfer column.

19. A process for hydrogen production, the process comprising:

reacting a hydrocarbon feed stream and oxygen into a reactor unit to form a product gas stream comprising $H_2$+CO;

passing the product gas stream comprising $H_2$+CO through a steam generating boiler to add steam to the product gas stream comprising $H_2$+CO;

converting the product gas stream comprising $H_2$+CO in at least one reactor to form a stream comprising $H_2$+$CO_2$;

heating the hydrocarbon feed stream against one or both of the product gas stream comprising $H_2$+CO and the stream comprising $H_2$+$CO_2$ in one or more heat exchangers;

heating a hydrocarbon fuel stream against a gas turbine exhaust stream in the one or more heat exchangers and outputting the heated hydrocarbon fuel stream to a gas turbine to produce power;

processing the stream comprising $H_2$+$CO_2$ in a pressure swing adsorber to provide a product stream formed of substantially pure hydrogen and also provide waste gas steam comprising $CO_2$;

separating the waste gas stream comprising $CO_2$ into a vapor phase stream depleted in $CO_2$ and a liquid product stream concentrated in $CO_2$, wherein at least 50 mol % of the $CO_2$ in the waste gas stream comprising $CO_2$ is separated into the liquid $CO_2$ product stream;

passing a first portion of the vapor phase stream depleted in $CO_2$ through the one or more heat exchangers to combine with the hydrocarbon feed stream; and passing a second portion of the vapor phase stream depleted in $CO_2$ to the gas turbine exhaust stream for heating the hydrocarbon fuel stream in the one or more heat exchanger.

\* \* \* \* \*

UNITED STATES PATENT AND TRADEMARK OFFICE
CERTIFICATE OF CORRECTION

PATENT NO. : 12,054,388 B2
APPLICATION NO. : 17/365611
DATED : August 6, 2024
INVENTOR(S) : Mohammad Rafati et al.

It is certified that error appears in the above-identified patent and that said Letters Patent is hereby corrected as shown below:

In the Specification

At Column 4, Line 17, the text "PDX" should be changed to -- POX --

At Column 4, Line 21, the text "PDX" should be changed to -- POX --

At Column 4, Line 23, the text "PDX" should be changed to -- POX --

At Column 4, Line 25, the text "PDX" should be changed to -- POX --

At Column 4, Line 28, the text "PDX" should be changed to -- POX --

At Column 4, Line 34, the text "PDX" should be changed to -- POX --

At Column 4, Line 35, the text "PDX" should be changed to -- POX --

At Column 4, Line 37, the text "PDX" should be changed to -- POX --

At Column 5, Line 18, the text "PDX an ATR, a PDX+GHR," should be changed to -- POX an ATR, a POX+GHR, --

At Column 7, Lines 45-46, the text "a PDX an ATR, a PDX+GHR," should be changed to -- a POX an ATR, a POX+GHR, --

At Column 8, Line 32, the text "PDX+GHR" should be changed to -- POX+GHR --

At Column 11, Line 41, the text "PDX reactor" should be changed to -- POX reactor --

At Column 18, Lines 54-55, the text "PDX reactor, an autothermal reforming (ATR) reactor, a PDX+GHR" should be changed to -- POX reactor, an autothermal reforming (ATR) reactor, a Signed and Sealed this
Tenth Day of December, 2024

Katherine Kelly Vidal
*Director of the United States Patent and Trademark Office*

CERTIFICATE OF CORRECTION (continued)
U.S. Pat. No. 12,054,388 B2

POX+GHR --

At Column 19, Line 10, the text "a PDX reactor" should be changed to -- a POX reactor --

At Column 21, Line 6, the text "the PDX or ATR or" should be changed to -- the POX or ATR or --

At Column 21, Line 41, the text "a PDX reactor 402" should be changed to -- a POX reactor 402 --

At Column 21, Line 45, the text "the PDX reactor with" should be changed to -- the POX reactor with --

At Column 21, Line 47, the text "the PDX reactor." should be changed to -- the POX reactor. --

At Column 21, Line 50, the text "the PDX reactor 302" should be changed to -- the POX reactor 302 --

At Column 21, Line 53, the text "the PDX reactor 302" should be changed to -- the POX reactor 302 --

At Column 21, Line 61, the text "the PDX reactor" should be changed to -- the POX reactor --

In the Claims

At Column 26, Claim 6, Line 22, the text "(PDX)" should be changed to -- (POX) --

At Column 26, Claim 8, Line 35, the text "(PDX)" should be changed to -- (POX) --

At Column 26, Claim 8, Line 41, the text "from the PDX reactor" should be changed to -- from the POX reactor --

At Column 28, Claim 19, Line 28, the text "heat exchanger." should be changed to -- heat exchangers. --